United States Patent [19]
Wise et al.

[11] Patent Number: 5,907,692
[45] Date of Patent: May 25, 1999

[54] DATA PIPELINE SYSTEM AND DATA ENCODING METHOD

[75] Inventors: Adrian Philip Wise; William Philip Robbins, both of Bristol; Martin William Sotheran, Dursley, all of United Kingdom

[73] Assignee: Discovision Associates, Irvine, Calif.

[21] Appl. No.: 08/804,620

[22] Filed: Feb. 24, 1997

Related U.S. Application Data

[63] Continuation of application No. 08/382,958, Feb. 2, 1995, abandoned, which is a continuation of application No. 08/082,291, Jun. 24, 1993, abandoned.

[30] Foreign Application Priority Data

Jun. 30, 1992 [EP] European Pat. Off. .............. 92306038

[51] Int. Cl.$^6$ ...................................................... G06F 15/82
[52] U.S. Cl. ....................... 395/377; 395/800.18; 382/232
[58] Field of Search ......................... 395/800.01, 800.16, 395/800.18, 376, 377, 500; 348/441; 382/232

[56] References Cited

U.S. PATENT DOCUMENTS

| Re. 33,632 | 7/1991 | Nakamura et al. ................... 358/261.1 |
| 3,875,391 | 4/1975 | Shapiro et al. ........................... 235/156 |
| 3,893,042 | 7/1975 | Whitman et al. ......................... 331/55 |
| 3,962,685 | 6/1976 | Belle-Isle ................................. 395/375 |
| 4,107,780 | 8/1978 | Grimsdale et al. ...................... 364/521 |
| 4,142,205 | 2/1979 | Iinuma ....................................... 358/13 |

(List continued on next page.)

FOREIGN PATENT DOCUMENTS

| 0196911 | 10/1986 | European Pat. Off. . |
| 0255767 | 2/1988 | European Pat. Off. . |
| 0468480 | 1/1992 | European Pat. Off. . |
| 0576749A1 | 6/1992 | European Pat. Off. .......... G06F 9/38 |
| 0572262 | 12/1993 | European Pat. Off. . |

(List continued on next page.)

OTHER PUBLICATIONS

Elliott J A et al: "Real–Time Simulation of Videophone Image Coding Algorithms on Reconfigurable Multicomputers," IEEE Proceedings E. Computers & Digital Techniques, vol. 139, No. 3 Part E., May 1, 1992, pp. 269–279, XP0000306411.

Hong, Yang–Chang; T.H. Payne. A Hybrid Approach for Efficient Dataflow Computing, Computers and Communications, 1990 Int'l Phoenix Conference. IEEE Publications, May 1990 pp. 170–178.

(List continued on next page.)

*Primary Examiner*—Larry D. Donaghue
*Assistant Examiner*—Walter D. Davis, Jr.
*Attorney, Agent, or Firm*—Robert T. Braun; Donald Bollella; Clay E. Gaetje

[57] ABSTRACT

A pipeline structure processes data in a series of stages, each of which has a data input latch (LDIN) and passes it on to the next stage in the pipeline via a data output latch (LDOUT). The stages are preferably connected to two non-overlapping clock phases (PH0, PH1). Adjacent stages are also connected via a validation line (IN_VALID, OUT_VALID) and an acceptance line (IN_ACCEPT, OUT_ACCEPT), and in some embodiments also via an extension bit line (IN_EXTN, OUT_EXTN). Input data is transferred from any stage to the following device on every complete period of both clock signals only if both the validation and acceptance signals in the respective latch are in an affirmative state, whereby data is transferred between stages regardless of the state of the validation and acceptance signals in other stages. A two-wire interface is thus formed between the stages. Address decoding circuitry may also be included in any of the stages so that a stage manipulates the input data stream only when one or more current data words have a predetermined bit pattern. The extension bit line conveys an extension bit that separates fields of different data blocks in the data stream. The invention also includes a method for uniquely encoding data blocks so that only intended pipeline stages are activated, with others simply passing input data through.

18 Claims, 16 Drawing Sheets

U.S. PATENT DOCUMENTS

| | | | |
|---|---|---|---|
| 4,149,242 | 4/1979 | Pirz | 395/325 |
| 4,196,448 | 4/1980 | Whitehouse et al. | 358/135 |
| 4,215,369 | 7/1980 | Iijima | 358/146 |
| 4,225,920 | 9/1980 | Stokes | 364/200 |
| 4,228,497 | 10/1980 | Gupta et al. | 364/200 |
| 4,302,775 | 11/1981 | Widergren et al. | 358/136 |
| 4,307,447 | 12/1981 | Provanzano et al. | 364/200 |
| 4,334,246 | 6/1982 | Saran | 358/261 |
| 4,433,308 | 2/1984 | Hirata | 331/17 |
| 4,437,072 | 3/1984 | Asami | 331/1 A |
| 4,467,409 | 8/1984 | Potash et al. | 364/200 |
| 4,495,629 | 1/1985 | Zasio et al. | 377/70 |
| 4,540,903 | 9/1985 | Cooke et al. | 307/465 |
| 4,580,066 | 4/1986 | Berndt | 307/276 |
| 4,598,372 | 7/1986 | McRoberts | 364/518 |
| 4,617,657 | 10/1986 | Drynan et al. | 370/60 |
| 4,630,198 | 12/1986 | Yuan | 364/200 |
| 4,646,151 | 2/1987 | Welles, II et al. | 358/149 |
| 4,679,163 | 7/1987 | Arnould et al. | 364/725 |
| 4,710,866 | 12/1987 | Zolnowsky et al. | 364/200 |
| 4,747,070 | 5/1988 | Trottier et al. | 364/900 |
| 4,785,349 | 11/1988 | Keith et al. | 358/136 |
| 4,789,927 | 12/1988 | Hannah | 395/800 |
| 4,799,677 | 1/1989 | Frederiksen | 273/1 E |
| 4,809,159 | 2/1989 | Sowa | 364/200 |
| 4,811,214 | 3/1989 | Nosenchuck et al. | 364/200 |
| 4,811,413 | 3/1989 | Kimmel | 382/41 |
| 4,814,978 | 3/1989 | Dennis | 364/200 |
| 4,823,201 | 4/1989 | Simon et al. | 358/133 |
| 4,829,465 | 5/1989 | Knauer et al. | 364/725 |
| 4,831,440 | 5/1989 | Borgers et al. | 358/133 |
| 4,837,739 | 6/1989 | McGill et al. | 364/900 |
| 4,841,436 | 6/1989 | Asano et al. | 364/200 |
| 4,843,632 | 6/1989 | Lee et al. | 382/233 |
| 4,855,947 | 8/1989 | Zymslowski et al. | 364/200 |
| 4,866,510 | 9/1989 | Goodfellow et al. | 358/13 |
| 4,866,637 | 9/1989 | Gonzalez-Lopez et al. | 364/518 |
| 4,885,786 | 12/1989 | Anderson et al. | 382/47 |
| 4,887,224 | 12/1989 | Okano et al. | 364/518 |
| 4,891,784 | 1/1990 | Kato et al. | 364/900 |
| 4,897,803 | 1/1990 | Calarco et al. | 364/518 |
| 4,903,018 | 2/1990 | Wiebach et al. | 341/51 |
| 4,912,668 | 3/1990 | Aubie et al. | 364/725 |
| 4,922,341 | 5/1990 | Strobach | 358/136 |
| 4,922,418 | 5/1990 | Dolecek | 364/200 |
| 4,924,298 | 5/1990 | Kitamura | 358/12 |
| 4,924,308 | 5/1990 | Feuchtwanger | 358/133 |
| 4,943,916 | 7/1990 | Asano et al. | 364/200 |
| 4,953,082 | 8/1990 | Nomura et al. | 364/200 |
| 4,975,595 | 12/1990 | Roberts et al. | 307/272.2 |
| 4,985,766 | 1/1991 | Morrison et al. | |
| 4,989,138 | 1/1991 | Radochonski | 364/200 |
| 4,991,112 | 2/1991 | Callemyn | 364/518 |
| 5,003,204 | 3/1991 | Cushing et al. | 307/465 |
| 5,014,138 | 5/1991 | Fischer et al. | 358/448 |
| 5,021,947 | 6/1991 | Campbell et al. | 364/200 |
| 5,027,212 | 6/1991 | Marlton et al. | 358/183 |
| 5,038,209 | 8/1991 | Hang | 358/136 |
| 5,043,880 | 8/1991 | Yoshida | 364/200 |
| 5,050,166 | 9/1991 | Cantoni et al. | 370/94.1 |
| 5,053,985 | 10/1991 | Friedlander et al. | 364/725 |
| 5,055,841 | 10/1991 | Cordell | 341/67 |
| 5,057,793 | 10/1991 | Cowley et al. | 331/1 A |
| 5,057,917 | 10/1991 | Shalkauser et al. | 358/135 |
| 5,060,242 | 10/1991 | Arbeiter | 375/122 |
| 5,081,450 | 1/1992 | Lucas et al. | 340/728 |
| 5,086,489 | 2/1992 | Shimura | 382/56 |
| 5,091,721 | 2/1992 | Hamori | 340/727 |
| 5,107,345 | 4/1992 | Lee | 358/432 |
| 5,109,304 | 4/1992 | Pederson | 360/51 |
| 5,111,292 | 5/1992 | Kuriacose et al. | 358/133 |
| 5,113,255 | 5/1992 | Nagata et al. | 358/133 |
| 5,122,873 | 6/1992 | Golin | 358/133 |
| 5,122,875 | 6/1992 | Raychaudhuri et al. | 358/133 |
| 5,122,948 | 6/1992 | Zapolin | 364/131 |
| 5,124,790 | 6/1992 | Nakayama | 358/133 |
| 5,126,842 | 6/1992 | Andrews et al. | 358/133 |
| 5,129,059 | 7/1992 | Hannah | 395/166 |
| 5,130,568 | 7/1992 | Miller et al. | 307/272.2 |
| 5,134,487 | 7/1992 | Taguchi et al. | 358/209 |
| 5,134,697 | 7/1992 | Scheffler | 395/425 |
| 5,136,371 | 8/1992 | Savatier et al. | 358/133 |
| 5,142,380 | 8/1992 | Sakagami et al. | 358/432 |
| 5,146,325 | 9/1992 | Ng | 358/135 |
| 5,146,326 | 9/1992 | Hasegawa | 358/135 |
| 5,148,271 | 9/1992 | Kato et al. | 358/133 |
| 5,148,524 | 9/1992 | Harlin et al. | 395/166 |
| 5,151,875 | 9/1992 | Sato | 364/784 |
| 5,159,449 | 10/1992 | Allmendinger | 358/136 |
| 5,163,149 | 11/1992 | Brantley, Jr. et al. | 395/650 |
| 5,164,819 | 11/1992 | Music | 358/13 |
| 5,168,356 | 12/1992 | Acampora et al. | 358/133 |
| 5,168,375 | 12/1992 | Reisch et al. | 358/432 |
| 5,172,011 | 12/1992 | Leuthold et al. | 307/272.2 |
| 5,173,695 | 12/1992 | Sun et al. | 341/67 |
| 5,174,641 | 12/1992 | Lim | 358/141 |
| 5,175,617 | 12/1992 | Wallace et al. | 358/133 |
| 5,179,372 | 1/1993 | West et al. | 340/799 |
| 5,182,642 | 1/1993 | Gersdorff et al. | 358/133 |
| 5,184,124 | 2/1993 | Molpus et al. | 341/50 |
| 5,184,347 | 2/1993 | Farwell et al. | 370/94.1 |
| 5,185,819 | 2/1993 | Ng et al. | 382/56 |
| 5,189,526 | 2/1993 | Sasson | 358/432 |
| 5,191,548 | 3/1993 | Balkanski et al. | 364/725 |
| 5,193,002 | 3/1993 | Guichard et al. | 358/133 |
| 5,201,056 | 4/1993 | Daniel et al. | 395/800 |
| 5,202,847 | 4/1993 | Bolton et al. | 364/725 |
| 5,203,003 | 4/1993 | Donner | 395/800 |
| 5,212,549 | 5/1993 | Ng et al. | 358/135 |
| 5,212,742 | 5/1993 | Normile et al. | 382/56 |
| 5,214,507 | 5/1993 | Aravind et al. | 358/133 |
| 5,214,770 | 5/1993 | Ramanujan et al. | 395/425 |
| 5,216,724 | 6/1993 | Suzuki et al. | 382/7 |
| 5,218,436 | 6/1993 | Sugiyama et al. | 358/141 |
| 5,223,926 | 6/1993 | Stone et al. | 358/133 |
| 5,226,131 | 7/1993 | Grafe et al. | 395/375 |
| 5,227,863 | 7/1993 | Bilbrey et al. | 348/578 |
| 5,227,878 | 7/1993 | Puri et al. | 358/136 |
| 5,228,098 | 7/1993 | Crinon et al. | 382/56 |
| 5,229,863 | 7/1993 | Kao et al. | 358/426 |
| 5,231,484 | 7/1993 | Gonzales et al. | 358/133 |
| 5,231,486 | 7/1993 | Acampora et al. | 358/133 |
| 5,233,420 | 8/1993 | Piri et al. | 358/149 |
| 5,233,545 | 8/1993 | Ho et al. | 364/569 |
| 5,233,690 | 8/1993 | Sherlock et al. | 395/165 |
| 5,237,413 | 8/1993 | Israelsen et al. | 358/160 |
| 5,241,222 | 8/1993 | Small et al. | 307/449 |
| 5,241,383 | 8/1993 | Chen et al. | 358/136 |
| 5,241,635 | 8/1993 | Papadopoulos et al. | 395/375 |
| 5,241,658 | 8/1993 | Masterson et al. | 395/162 |
| 5,247,612 | 9/1993 | Quinard | 395/166 |
| 5,249,146 | 9/1993 | Uramoto et al. | 364/725 |
| 5,253,056 | 10/1993 | Gharavi | 358/136 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,257,350 | 10/1993 | Howard et al. | 395/162 |
| 5,258,725 | 11/1993 | Kinoshita | 331/17 |
| 5,260,781 | 11/1993 | Soloff et al. | 358/133 |
| 5,260,782 | 11/1993 | Hui | 358/133 |
| 5,261,047 | 11/1993 | Rivshin | 395/163 |
| 5,263,136 | 11/1993 | DeAguiar et al. | 395/164 |
| 5,267,334 | 11/1993 | Normille et al. | 382/56 |
| 5,276,513 | 1/1994 | van der Wal et al. | 358/136 |
| 5,276,681 | 1/1994 | Tobagi et al. | 370/85.4 |
| 5,276,784 | 1/1994 | Ohki | 395/127 |
| 5,278,520 | 1/1994 | Parker et al. | 331/1 A |
| 5,278,646 | 1/1994 | Civanlar et al. | 358/133 |
| 5,278,647 | 1/1994 | Hingorani et al. | 358/136 |
| 5,283,646 | 2/1994 | Bruder | 348/415 |

| | | | |
|---|---|---|---|
| 5,287,178 | 2/1994 | Acampora et al. | 348/384 |
| 5,287,193 | 2/1994 | Lin | 358/261.1 |
| 5,287,420 | 2/1994 | Barrett | 382/56 |
| 5,289,276 | 2/1994 | Siracusa et al. | 348/467 |
| 5,289,577 | 2/1994 | Gonzales et al. | 395/163 |
| 5,293,229 | 3/1994 | Iu | 348/415 |
| 5,294,894 | 3/1994 | Gebara | 331/1 A |
| 5,297,263 | 3/1994 | Ohtsuka et al. | 395/375 |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,242 | 4/1994 | Gonzales et al. | 382/56 |
| 5,301,272 | 4/1994 | Atkins | 395/165 |
| 5,301,344 | 4/1994 | Kolchinsky | 395/800 |
| 5,303,342 | 4/1994 | Edge | 395/164 |
| 5,304,953 | 4/1994 | Heim et al. | 331/1 A |
| 5,305,438 | 4/1994 | MacKay et al. | 395/164 |
| 5,307,449 | 4/1994 | Kelley et al. | 395/119 |
| 5,309,527 | 5/1994 | Ohki | 382/56 |
| 5,309,563 | 5/1994 | Farrand et al. | 395/200 |
| 5,311,309 | 5/1994 | Ersoz et al. | 348/409 |
| 5,325,092 | 6/1994 | Allen et al. | 341/65 |
| 5,329,313 | 7/1994 | Keith | 348/422 |
| 5,329,619 | 7/1994 | Page et al. | 395/200 |
| 5,333,212 | 7/1994 | Ligtenberg | 382/56 |
| 5,333,266 | 7/1994 | Boaz et al. | 395/200 |
| 5,351,047 | 9/1994 | Behlen | 341/67 |
| 5,367,636 | 11/1994 | Colley et al. | 395/200.16 |
| 5,406,279 | 4/1995 | Anderson et al. | 341/51 |
| 5,412,782 | 5/1995 | Hausman et al. | 395/250 |
| 5,414,813 | 5/1995 | Shiobara | 395/200 |
| 5,421,028 | 5/1995 | Swanson | 395/800 |
| 5,442,790 | 8/1995 | Nosenchuck | 395/700 |
| 5,446,866 | 8/1995 | Drako et al. | 395/500 |
| 5,448,310 | 9/1995 | Kopet et al. | 348/719 |
| 5,450,599 | 9/1995 | Horvath et al. | 395/800 |
| 5,452,006 | 9/1995 | Auld | 348/390 |
| 5,457,780 | 10/1995 | Shaw et al. | 395/165 |
| 5,461,679 | 10/1995 | Normile et al. | 395/650 |
| 5,481,689 | 1/1996 | Stamm et al. | 395/412 |
| 5,487,064 | 1/1996 | Galand et al. | 370/64 |
| 5,490,247 | 2/1996 | Tung et al. | 395/162 |
| 5,495,291 | 2/1996 | Adams | 348/390 |
| 5,497,498 | 3/1996 | Taylor | 395/800 |
| 5,504,869 | 4/1996 | Uchida | 395/375 |
| 5,510,857 | 4/1996 | Kopet et al. | 348/699 |
| 5,517,603 | 5/1996 | Kelley et al. | 395/126 |
| 5,517,670 | 5/1996 | Allen et al. | 395/850 |
| 5,535,290 | 7/1996 | Allen | 382/250 |
| 5,566,089 | 10/1996 | Hoogenboom | 364/514 A |
| 5,574,933 | 11/1996 | Horst | 395/800 |
| 5,579,052 | 11/1996 | Artieri | 348/416 |
| 5,590,283 | 12/1996 | Hillis et al. | 395/200.02 |

FOREIGN PATENT DOCUMENTS

| | | |
|---|---|---|
| 0572263 | 12/1993 | European Pat. Off. . |
| 0576749 | 1/1994 | European Pat. Off. . |
| 0589734 | 3/1994 | European Pat. Off. . |
| 0618728 | 5/1994 | European Pat. Off. . |
| 0639032 | 2/1995 | European Pat. Off. . |
| 2045035 | 10/1980 | United Kingdom . |
| 2059724 | 4/1981 | United Kingdom . |
| 2171578 | 8/1986 | United Kingdom . |
| 2194085 | 2/1988 | United Kingdom . |
| 2268035 | 12/1993 | United Kingdom . |
| 2269070 | 1/1994 | United Kingdom . |
| 9425935 | 11/1994 | WIPO ... G06K 15/00 |

OTHER PUBLICATIONS

Kaoru, Uchida et al: "A Pipelined Dataflow Processor Architecture Based on a Variable Length Token Concept," Architecture, University Park, Aug. 15–19, 1988, vol. 1, Aug. 15, 1988, Briggs F A, pp. 209–216, XP000079309.

Normile, James. Dan Wright, Image Compression Using Coarse Grain Parallel Processing, ICASSP 1991: Acoustics, Speech & Signal Processing Conference, IEEE Publications. Jul. 1991 pp. 1121–1124.

P. Yip, et al., "DIT and DIF Algorithm for Discrete Sine and Cosine Transforms" Proceedings of the International Symposium on Circuits and Systems, IEEE Press, New York, US, vol. 2/3, Jun. 5, 1985, Kyoto, JP, pp. 941–944.

Tokumichi Murakami et al: "A DSP Architectural Design for Low Bit-Rate Motion Video Codec," IEEE Transactions on Circuits and Systems, vol. 36, No. 10, Oct. 1, 1989, pp. 1267–1274, XP000085313.

Yang, Kun–Min. VLSI Architecture Design of a Versatile Variable Length Decoding Chip for Real–Time Video Codecs, TENCON 1990 IEEE Region 10 Conference on Computer and Communication . . . , IEEE Publications Feb. 1990, pp. 551–554.

A. Gupta et al., "A Fast Recursive Algorithm for the Discrete Sine Transform," IEEE Transactions on Acoustics, Speech, and Signal Processing, vol. 38, No. 3, Mar. 1990, IEEE Press, New York, US, pp. 553–557.

H.R. Wu, et al., "A Two Dimensional Fast Cosine Transform Algorithm Based on Hou's Approach," IEEE Transaction on Acoustics, Speech, and Signal Processing, vol. 39, No. 2, Feb. 1991, IEEE Press, New York, US, pp. 544–546 Examiner.

Kopet, Tom: "Programmable Architectures for Real–Time Video Compression," 4th International Conference on Signal Processing Applications & Technology, vol. 2, Sep. 28, 1993–Oct. 1, 1993, Santa Clara, California, USA, pp. 1031–1038.

Macinnis, Alexander G. "The MPEG Systems Coding Specification." Signal Processing: Image Communication 4 (1992) pp. 153–159.

Mayer, A.C.: "The Architecture of a Single–Chip Processor Array for Videocompression," Proceedings of the International Conference on Consumer Electronics, Rosemont, Jun. 8–10, 1993, No. Conf. 12, Aug. 6, 1993, Institute of Electrical and Electronics Engineers, pp. 294–295, XP0000427624.

McCarthy, Charles L. "A Low–Cost Audio/Video Decoder Solution for MPEG System Streams." IEEE Jun. 21, 1994, pp. 312–313.

Chong, "A Data Flow Architecture for Digital Image Processing," Wescon Tech. Papers No. 4/6, Oct. 30, 1984, pp. 1–10.

Komori et al., "An Elastic Pipeline Mechanism by Self–Timed Circuits," IEEE Journal of Solid–State Circuits, vol. 23, No. 1, Feb. 1988, pp. 111–117.

Hsieh S. Hou, "A Fast Recursive Algorithm for Computing the Discrete Cosine Transform," IEEE Transactions on Acoustics, Speech, and Signal Processing, vol. 35, No. 10, Oct. 1987, IEEE Press, New York, US, pp. 1455–1461.

Komori, et al., An elastic pipeline mechanism by self–timed circuits, IEEE Journal of Solid–State Circuits, Vo. 23, No. 1, Feb. 1988 pp. 111–117.

DATA PIPELINE SYSTEM AND DATA ENCODING METHOD

This application is a continuation of application Ser. No. 08/382,958, filed Feb. 2, 1995, now abandonded, which application is a continuation of application Ser. No. 08/082,291, filed Jun. 24, 1993 now abandonded.

TECHNICAL FIELD

This invention relates to a pipeline of processing stages and storage elements and also includes a method for encoding data within the pipeline.

BACKGROUND ART

Increasing the rate at which digital data can be processed is an important goal in almost every analog and digital design. One known structure for data processing is commonly referred to as a "pipeline". In a typical pipeline structure, data is received at a first processing station or stage and is passed in a predetermined order to subsequent stages in the pipeline. Each pipeline stage may either process the data or simply act as a conduit and pass it on during the next clock cycle of the pipeline.

Existing pipelines, however, are typically "rigid", so that a delay at in stage of the pipeline causes the entire pipeline to stop; the pipeline must wait until the busy stage has completed its task. Depending on the application, data could then either be lost or must be stored temporarily and later retrieved and processed even faster in order to "catch up". In any case, however, stopping the entire pipeline because of a delay in one stage reduces the processing speed and efficiency of the pipeline structure.

As one example, in systems involving the transfer of digital video data, a pipeline may be used to receive and process transmitted video data. In such image transmission systems, if data can be processed faster, than either that more channels of information can be transmitted and processed simultaneously using the same medium, or more data can be transmitted and processed for each image for a given period of time.

In digital television systems, such as the High-Definition TV (HDTV) that is expected to replace existing analog technology, the faster digital video data can be processed, the better the resolution one can obtain. As with photographs, the finer the grain, the more life-like the image will be. Similarly, the more picture elements ("pixels") a television screen contains, and the faster the screen image is updated, the more life-like the picture will appear.

In order to achieve high-speed transfer and processing of video data, however, the television set that receives the signals must obviously be able to receive and process the signals as fast as they are sent. Otherwise, assuming a steady stream of transmitted data, any temporary memory storage devices used in the receiver might eventually fill up and data would be lost since the storage devices must be of a size limited to a range on the order of tens of frames. Storage devices sufficient to store hundreds of frames are not practical or desirable in most video reception devices.

Temporary, high-speed storage of transmitted data for use at a lower processing rate in a receiving device is therefore only suitable for a known, limited amount of data, and data transmission must not be so fast that the storage device fills up before the receiver is finished processing the data it has already received and stored. In video applications such as television, however, "slow motion" processing by the receiver would obviously be unacceptable. The receiver should therefore be able to receive data no slower than the rate at which it is transmitted. If a rigid pipeline is used to process such digital video signals, a delay in any stage of the pipeline causes the entire pipeline to stop. In such case, transmission must halt, or transmitted data must be stored temporarily lest it be lost altogether.

Another drawback of existing data pipelines is that whenever one stage in the pipeline is delayed, corresponding control signals must be propagated all the way back through earlier stages to the initial pipeline stage in order to prevent further processing until the active stage has completed its task. This means that earlier stages in the pipeline are unnecessarily idle.

What is needed is a data pipeline structure that does not suffer from the disadvantages mentioned above, each of which causes existing pipeline structures to process data more slowly. In particular, an improved pipeline structure should have the following characteristics:

1. The pipeline should be "elastic" such that a slow-down at a following pipeline stage should not lock up preceding pipeline stages and prevent processing in other stages;
2. It should not be necessary for signals to propagate back to the beginning of the pipeline when a later pipeline processing stage is not able to accept new data;
3. A pipeline stage should not need to know in advance anything about the data that it is accepting; and
4. No time should be spent before transferring data between pipeline stages in order to establish the parameters of the transfer.

It is the object of this invention to provide a pipeline structure for data processing that meets these needs.

SUMMARY OF THE INVENTION

A pipeline for processing data includes a plurality of sequential pipeline stages, each of which has a data input and a data output. The data output of each stage is connected to the data input of the following stage. Each stage also has a storage unit for data and also for a signal indicating the validness of the data contained in the stage. The storage units also have a means that enables them to be loaded. The preferred embodiment also includes acceptance circuitry, with a data acceptance signal being passed from each stage to a preceding stage.

In a preferred embodiment, the data and the validation signal are loaded into each stage at the same time. Also in the preferred embodiment, each pipeline stage includes an auxiliary data storage unit so that, if the following stage is unable to accept data yet the preceding stage signals its readiness to load new data into the current stage, the current stage moves the already loaded data into the auxiliary storage unit and is then able to accept the new data into the primary data storage unit.

According to another aspect of the preferred embodiment, the acceptance signal is used to inhibit or enable loading of data and the validation signal. The acceptance signal of each stage is set to indicate readiness to accept data when the current stage does not contain valid data, or when the following stage has indicated its readiness to accept data. Data is then transferred into each stage that signals readiness to accept. Input data is thereby transferred from any pipeline stage to its respective following device if both the validation and acceptance signals in the respective latch are in the affirmative state, whereby data is transferred between stages regardless of the state of the validation and acceptance signals in other stages.

According to still another aspect of the preferred embodiment, each stage also includes a storage unit for the acceptance signal passed from the following stage. Transfer of the acceptance signal is limited to the nearest preceding neighbor.

According to yet another aspect of the preferred embodiment, the pipeline includes a multi-phase clock, whereby loading of primary and auxiliary storage units takes place on different phases.

In a specific embodiment, each pipeline stage includes predetermined processing circuitry that has an active mode, in which the stage processes the data, and an inactive mode, in which the stage simply passes on the data to the following stage. Each pipeline stage thereby also includes an input and an output data latch, an input and an output validation latch, and an input and an output acceptance latch.

In this embodiment, predetermined ones of the pipeline stages include data decoding circuitry, whereby the processing circuitry of each pipeline stage enters the active mode only when the input data and/or other signals connected to the decoding circuitry have a predetermined stage activation pattern.

According to yet another aspect of another embodiment of the invention, stages are further connected via an extension bit line that conveys an extension bit that is transmitted in addition to data words in order to group data words into data blocks. Each stage thereby includes latches for loading the present and previous value of the extension bit and acts as a state machine to manipulate and pass on data based on transitions in the extension bit.

The invention also encompasses a method for encoding data into the data stream: data is blocked into data words, with each word having an associated extension bit. A field of address bits is inserted in the first data words in a transmitted block, followed by data that is to be processed by one or more stages that are activated by the pattern of address bits. The address field is preferably encoded using a Huffman code.

DETAILED DESCRIPTION

Figure 1:
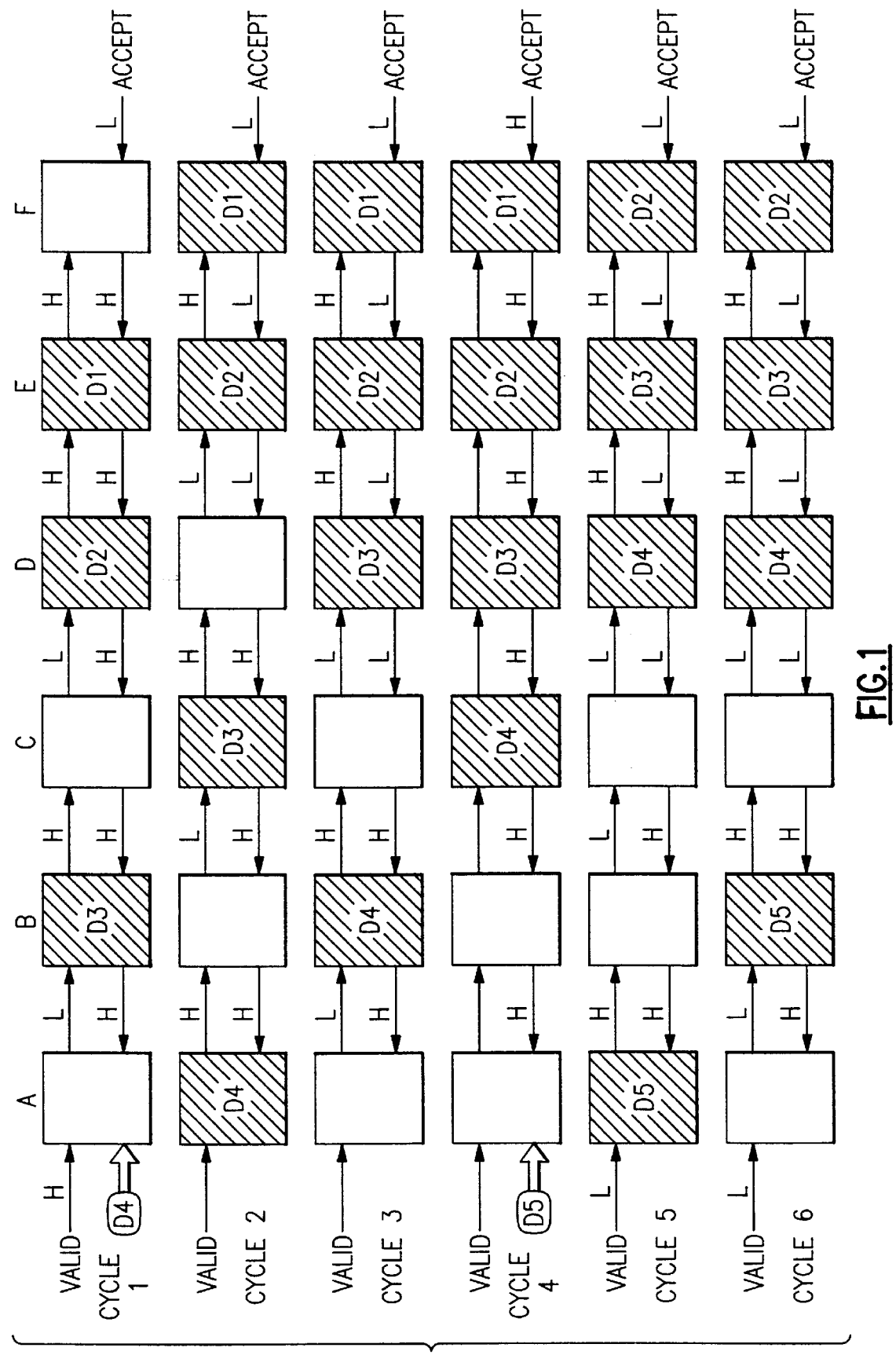
FIG. 1 illustrates six cycles of a six-stage pipeline for different combinations of two internal control signals.

As an introduction to the most general features used in the preferred embodiments of the invention, FIG. 1 is a greatly simplified illustration of six cycles of a six-stage pipeline. (As is explained in greater detail below, the preferred embodiment of the invention includes several advantageous features not shown in FIG. 1.)

In FIG. 1, each row of boxes illustrates a cycle, and the different stages are labelled A–F. Each shaded box indicates that the corresponding stage holds valid data, that is, data that is to be processed in one of the pipeline stages. After processing (which may involve nothing more than a simple transfer without manipulation of the data) valid data is transferred out of the pipeline as valid output data.

Note that an actual pipeline application may include more or fewer than six pipeline stages. The invention may be used for any number of pipeline stages. Furthermore, data may be processed in more than one stage and processing time for different stages will normally differ, although this is not necessary.

In addition to clock and data signals (described below), the pipeline includes two transfer control signals —a "VALID" signal and an "ACCEPT" signal—to control the transfer of data within the pipeline. The VALID signal, which is illustrated as the upper of two lines connecting neighboring stages, is passed in a forward or downstream direction from each pipeline stage to the nearest neighboring device, which may be another pipeline stage or some other system; for example, the last pipeline stage may pass its data on to subsequent processing circuitry. The ACCEPT signal, which is illustrated as the lower of two lines connecting neighboring stages, passes in the other direction upstream to a preceding device.

Although not shown in FIG. 1, data lines, either single lines or several parallel lines forming a data bus, also lead into and out of each pipeline stage. As is explained and illustrated in greater detail below, data is transferred into, out of, and between the stages of the pipeline over the data lines.

Note that the first pipeline stage may either receive data and control signals from any form of preceding device, (for example, reception circuitry of a digital image transmission system, another pipeline, etc.), or it may itself generate all or part of the data to be processed in the pipeline. Indeed, as is explained below, a "stage" may contain arbitrary processing circuitry, including none at all (for simple passing on of data) and entire systems (for example, another pipeline or even multiple systems or pipelines), and it may generate, change, and delete data as desired.

When a pipeline stage contains valid data that is to be transferred down the pipeline, the VALID signal, which indicates data validity, need not be transferred farther than to the immediately following pipeline stage. A two-wire interface is therefore included between every pair of pipeline stages in the system (and between a preceding device and the first stage, and between a following device and the last stage, if such other devices are included and data is to be transferred between them and the pipeline).

Each of the signals ACCEPT and VALID has a HIGH and a LOW value; these values are abbreviated as "H" and "L", respectively. The most common applications of the pipeline according to the invention will typically be digital; in such digital implementations, the HIGH value may, for example, be a logical "1" and the LOW value may be the logical "0". The invention is not restricted to digital implementations, however, and in analog implementations, the HIGH value may be a voltage or other similar quantity above (or below) a set threshold, with the LOW value being indicated by the corresponding signal being below (or above) the same or some other threshold. For digital applications, the invention may be implemented using any known technology, such as CMOS, bipolar, etc.

In FIG. 1, the state of the VALID signal into each stage is indicated as an "H" or an "L" on an upper, right-pointing arrow. The VALID signal from Stage A into Stage B is thus LOW, and the VALID signal from Stage D into stage E is HIGH. The state of the ACCEPT signal into each stage is indicated as an "H" or an "L" on a lower, left-pointing arrow. The ACCEPT signal from Stage E into Stage D is thus HIGH, whereas the ACCEPT signal from the device connected downstream of the pipeline into Stage F is LOW.

Data is transferred from one stage to another during a cycle (explained below) whenever the ACCEPT signal of the downstream stage into its upstream neighbor is HIGH. If the ACCEPT signal is LOW between two stages, then data is not transferred between these stages.

In FIG. 1, if a box is shaded, the corresponding pipeline stage is assumed, by way of example, to contain valid output data and the VALID signal from that stage into the following stage is HIGH. FIG. 1 illustrates the pipeline when stages B, D, and E contain valid data. Stages A, C, and F do not contain valid data. At the start, the VALID signal into pipeline stage A is HIGH, meaning that the data on the transmission line into the pipeline is valid.

Also at this time, the ACCEPT signal into pipeline stage F is LOW, so that no data, whether valid or not, is transferred out of Stage F. Note that both valid and invalid data is transferred between pipeline stages. Invalid data, which is data not worth saving, may be written over (thereby eliminating it from the pipeline), whereas valid data must not be written over since it is data that must be saved for processing or use in a downstream device (such as a pipeline stage or a device or system connected to the pipeline and receives data from the pipeline).

In the pipeline illustrated in FIG. 1, Stage E contains valid data D1, Stage D contains valid data D2, Stage B contains valid data D3, and a device (not shown) connected to the pipeline upstream contains data D4 that is to be transferred into and processed in the pipeline. Stages B, D, and E, as well as the upstream device, contain valid data and the VALID signal from these stages or devices into the respective following devices is therefore HIGH. The VALID signal from the Stages A, C, and F is, however, LOW since these stages do not contain valid data.

Assume now that the device connected downstream from the pipeline is not ready to accept data from the pipeline. It signals this by setting the corresponding ACCEPT signal LOW into Stage F. Stage F itself, however, does not contain valid data and is therefore able to accept data from the preceding Stage E. The ACCEPT signal from Stage F into Stage E is therefore set HIGH.

Similarly, although Stage E contains valid data, Stage F is ready to accept this data, so that Stage E itself also can accept new data as long as the valid data D1 is first transferred to Stage F. In other words, although Stage F cannot transfer data downstream, all the other stages can do so without any valid data being overwritten and lost. At the end of Cycle 1, data can therefore be "shifted" one step to the right. This condition is shown in Cycle 2.

In the illustrated example, the downstream device is still not ready to accept new data in Cycle 2 so that the ACCEPT signal into Stage F is still LOW. Stage F cannot, therefore, accept new data since doing so would cause valid data D1 to be overwritten and lost. The ACCEPT signal from Stage F into Stage E therefore goes LOW, as does the ACCEPT signal from Stage E into Stage D, since Stage E also contains valid data D2. All of the Stages A–D, however, are able to accept new data (either because they do not contain valid data or because they are able to shift their valid data downstream and accept new) and they signal this condition to their immediately preceding neighbors by setting their corresponding ACCEPT signals HIGH.

The state of the pipelines after Cycle 2 is illustrated in FIG. 1 for the row labelled Cycle 3. By way of example, it is assumed that the downstream device still is not ready to accept new data from Stage F (the ACCEPT signal into Stage F is LOW). Stages E and F therefore still are "blocked", but in Cycle 3, Stage D has received the valid data D3, which overwrote the invalid data that was previously in this stage. Since Stage D cannot pass on data D3 in Cycle 3, it cannot accept new data and therefore sets the ACCEPT signal into Stage C LOW. Stages A–C are, however, ready to accept new data and signal this by setting their corresponding ACCEPT signals HIGH. Note that data D4 has been shifted from Stage A to Stage B.

Assume now that the downstream device becomes ready to accept new data in Cycle 4. It signals this to the pipeline by setting the ACCEPT signal into Stage F HIGH. Although Stages C–F contain valid data, they can now shift the data downstream and are thus able to accept new data. Since each stage is therefore able to shift data one step downstream, they set their respective ACCEPT signals out HIGH.

As long as the ACCEPT signal into the final pipeline stage (in this example, Stage F) is HIGH, the pipeline shown in FIG. 1 thus acts as a rigid pipeline and simply shifts data one step downstream on each cycle. Accordingly, in Cycle 5, data D1, which was contained in Stage F in Cycle 4, is shifted out of the pipeline to the following device, and all other data is shifted one step downstream.

Assume now that the ACCEPT signal into Stage F goes LOW in Cycle 5. Once again, this means that Stages D–F are not able to accept new data, and the ACCEPT signals out of these stages into their immediately preceding neighbors also go LOW. The data D2, D3 and D4 therefore cannot shift downstream, although the data D5 can. The corresponding state of the pipeline after Cycle 5 is thus shown in FIG. 1 as Cycle 6.

The ability of the pipeline according to the preferred embodiments of the invention to "fill up" empty processing stages is highly advantageous since the processing stages in the pipeline thereby become decoupled from one another. In other words, even though a pipeline stage may not be ready to accept data, the entire pipeline does not have to stop and wait for the delayed stage. Rather, when one stage is not able to accept valid data it simply forms a temporary "wall" in the pipeline; stages downstream of the "wall" can continue to advance valid data even to the circuitry connected to the pipeline, and stages to the left of the "wall" stage can still accept and transfer valid data downstream. Even when several pipeline stages temporarily cannot accept new data, other stages can continue to operate normally. In particular, the pipeline can continue to accept data into its initial stage A as long as stage A does not already contain valid data that cannot be advanced due to the next stage not being ready to accept new data. As this example illustrates, data can be transferred into the pipeline and between stages even when one or more processing stages is blocked.

In the embodiment of the invention shown in FIG. 1, it is assumed that the various pipeline stages do not store the ACCEPT signals they receive from their immediately following neighbors; instead, whenever the ACCEPT signal into a downstream stage goes LOW, this LOW signal is propagated upstream as far as to the nearest pipeline stage that does not contain valid data. For example, referring to FIG. 1, it was assumed that the ACCEPT signal into Stage F goes LOW in Cycle 1. In Cycle 2, the LOW signal propagates from Stage F back to Stage D.

In Cycle 3, when the data D3 is latched into Stage D, the ACCEPT signal propagates upstream four stages to Stage C. When the ACCEPT signal into stage F goes HIGH in Cycle 4, it must propagate upstream all the way to Stage C; in other words, the change in the ACCEPT signal must propagate back four stages. It is not necessary, however, in the embodiment illustrated in FIG. 1 for the ACCEPT signal to propagate all the way back to the beginning of the pipeline if there is some intermediate stage that is able to accept new data.

In the embodiment illustrated in FIG. 1, each pipeline stage will still need separate input and output data latches in order to allow data to be transferred between stages without unintended overwriting. Also, although the pipeline illustrated in FIG. 1 is able to "compress" when downstream pipeline stages are blocked (cannot pass on the data they contain), the pipeline does not "expand" to create stages that do not contain valid data between stages that contain valid data. Rather, the ability to compress depends on there being cycles during which no valid data is presented to the first pipeline stage.

In Cycle 4, for example, if the ACCEPT signal into Stage F remained LOW and valid data filled pipeline stages A and B, as long as valid data continued to be presented to Stage A the pipeline would not be able to compress any further and valid input data could be lost. Nonetheless, the pipeline illustrated in FIG. 1 reduces the risk of data loss since it is able to compress as long as there is some pipeline stage that does not contain valid data.

Figure 2A:
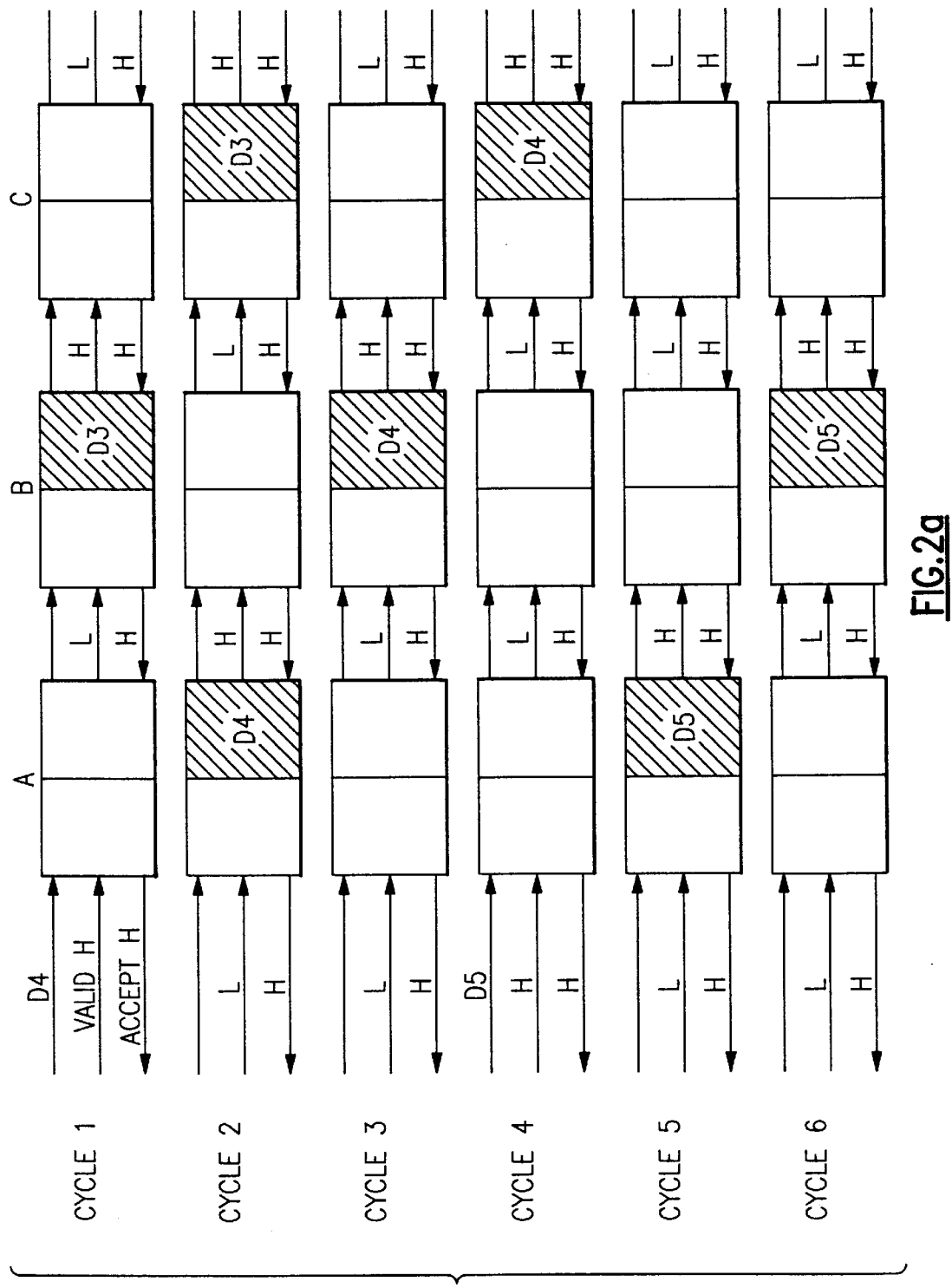
FIGS. 2a and 2b illustrates a pipeline in which each stage includes auxiliary data storage, and it also shows the manner in which pipeline stages can "compress" and "expand" in response to delays in the pipeline.
Figure 2B:
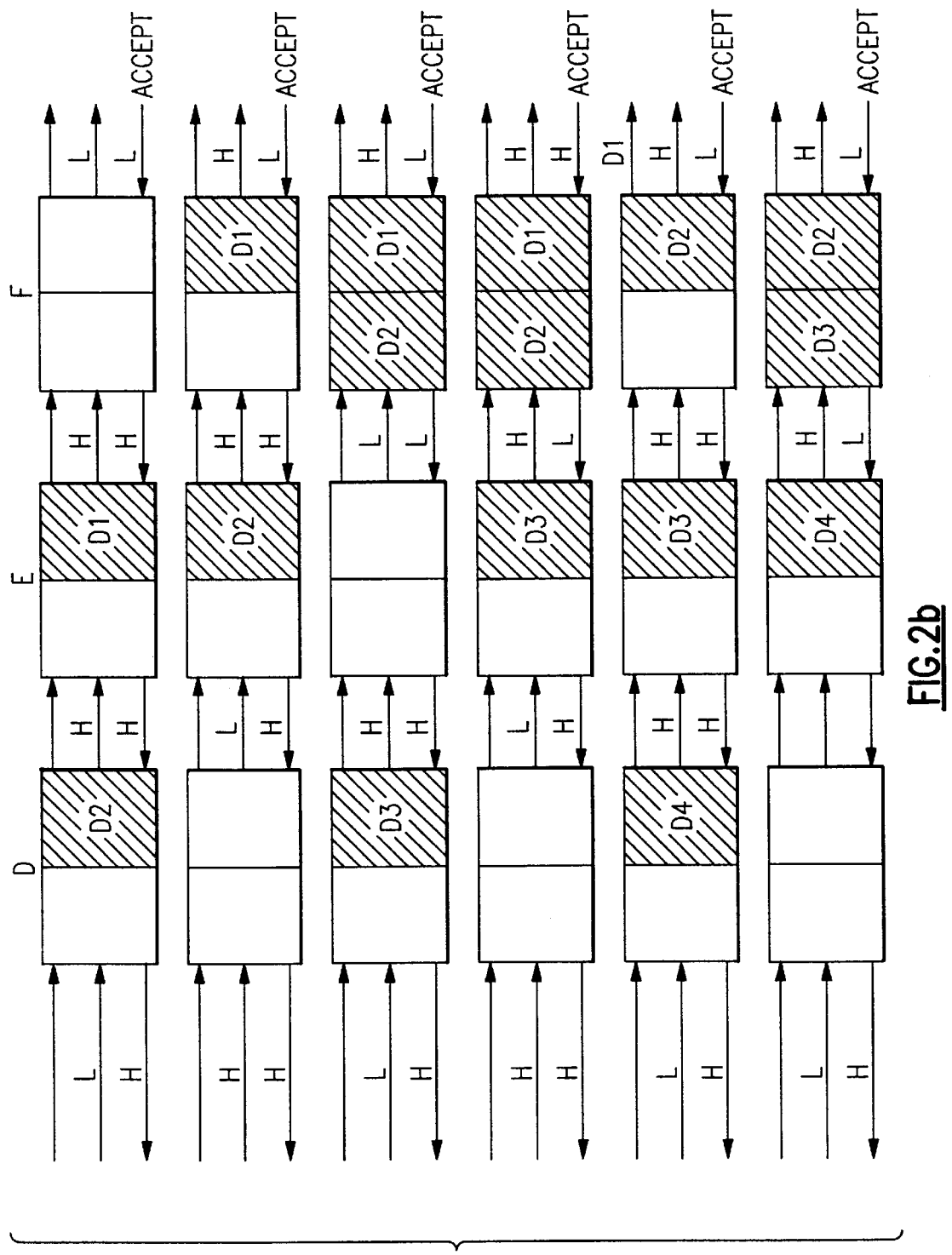

FIGS. 2A and 2B illustrate an embodiment of the invention that can both compress and expand in a logical manner and which includes circuitry that limits propagation of the ACCEPT signal to the nearest preceding stage. Although the circuitry for implementing this embodiment is explained and illustrated in greater detail below, FIGS. 2A and 2B serve to illustrate the principle by which it operates.

For ease of comparison only, the input data and ACCEPT signals into the pipeline embodiment shown in FIGS. 2A and 2B are the same as in the pipeline embodiment shown in FIG. 1. Accordingly, stages E, D, and B contain valid data D1, D2, and D3, respectively; the ACCEPT signal into Stage F is LOW; and data D4 is presented to the beginning pipeline Stage A. In FIGS. 2A and 2B, three lines are shown connecting each neighboring pair of pipeline stages. The uppermost line, which may be a bus, is a data line; the middle line is the line over which the VALID signal is transferred; and the bottom line is the line over which the ACCEPT signal is transferred. Also as before, the ACCEPT signal into Stage F remains LOW except in Cycle 4. Furthermore, additional data D5 is presented to the pipeline in Cycle 4.

In FIGS. 2A and 2B, each pipeline stage is represented as a block divided into two halves to illustrate that each stage in this embodiment of the pipeline includes primary and secondary data storage elements. In FIGS. 2A and 2B, the primary data storage is shown as the right half of each stage, although this is for purposes of illustration only.

As FIGS. 2A and 2B, illustrate, as long as the ACCEPT signal into a stage is HIGH, data is transferred from the primary storage elements of the stage to the secondary storage elements of the following stage during any given cycle. Accordingly, although the ACCEPT signal into Stage F is LOW, the ACCEPT signal into all other stages is HIGH so that the data D1, D2, and D3 is shifted forward one stage in Cycle 2 and the data D4 is shifted into the first Stage A.

Up to this point, the pipeline embodiment shown in FIGS. 2A and 2B therefore acts in a manner similar to the pipeline embodiment shown in FIG. 1. The ACCEPT signal from Stage F into Stage E, however, is HIGH even though the ACCEPT signal into Stage F is LOW. As is explained below, because of the secondary storage elements, it is not necessary for the LOW ACCEPT signal to propagate upstream beyond Stage F. By leaving the ACCEPT signal into Stage E HIGH, moreover, Stage F signals that it is ready to accept new data. Since Stage F is not able to transfer the data D1 in its primary storage elements downstream (the ACCEPT signal into Stage F is LOW), in Cycle 3, Stage E therefore transfers the data D2 into the secondary storage elements of Stage F. Since both the primary and the secondary storage elements of Stage F then contain valid data that cannot be passed on, the ACCEPT signal from Stage F into Stage E is set LOW—this represents a propagation of the LOW ACCEPT signal back only one stage relative to Cycle 2, whereas this ACCEPT signal had to be propagated back all the way to Stage C in the embodiment shown in FIG. 1.

Since Stages A–E are able to pass on their data, the ACCEPT signals from the stages into their immediately preceding neighbors are set HIGH. Consequently, the data D3 and D4 are shifted one stage to the right so that, in Cycle 4, they are loaded into the primary data storage elements of Stage E and Stage C, respectively. Although Stage E now contains valid data D3 in its primary storage elements, its secondary storage elements can still be used to store other data without risk of overwriting any valid data.

Assume now as before that the ACCEPT signal into Stage F becomes HIGH in Cycle 4. This indicates that the downstream device to which the pipeline passes data is ready to accept data from the pipeline. Stage F, however, has set its ACCEPT signal LOW and thus indicates to Stage E that Stage F is not prepared to accept new data. Observe that the ACCEPT signals for each cycle indicate what will "happen" in the next cycle, that is, whether data will be passed on (ACCEPT HIGH) or whether data must remain in place (ACCEPT LOW). From Cycle 4 to Cycle 5 the data D1 is therefore passed from Stage F to the following device, the data D2 is shifted from secondary to primary storage in Stage F, but the data D3 in Stage E is not transferred to Stage F. The data D4 and D5 can be transferred into the following pipeline stages as normal since the following stages have their ACCEPT signals HIGH.

Comparing the state of the pipeline in Cycle 4 and Cycle 5, it can be seen that the provision of secondary storage elements enables the pipeline embodiment shown in FIGS. 2A and 2B to expand, that is, to free up data storage elements into which valid data can be advanced. For example, in Cycle 4, the data blocks D1, D2, and D3 form a "solid wall" since their data cannot be transferred until the ACCEPT signal into Stage F goes HIGH. Once this signal does become HIGH, however, data D1 is shifted out of the pipeline, data D2 is shifted into the primary storage elements of Stage F, and the secondary storage elements of Stage F become free to accept new data if the following device is not able to receive the data D2 and the pipeline must once again "compress"; this is shown in Cycle 6, for which the data D3 has been shifted into the secondary storage elements of Stage F and the data D4 has been passed on from Stage D to Stage E as normal.

Figure 3G:
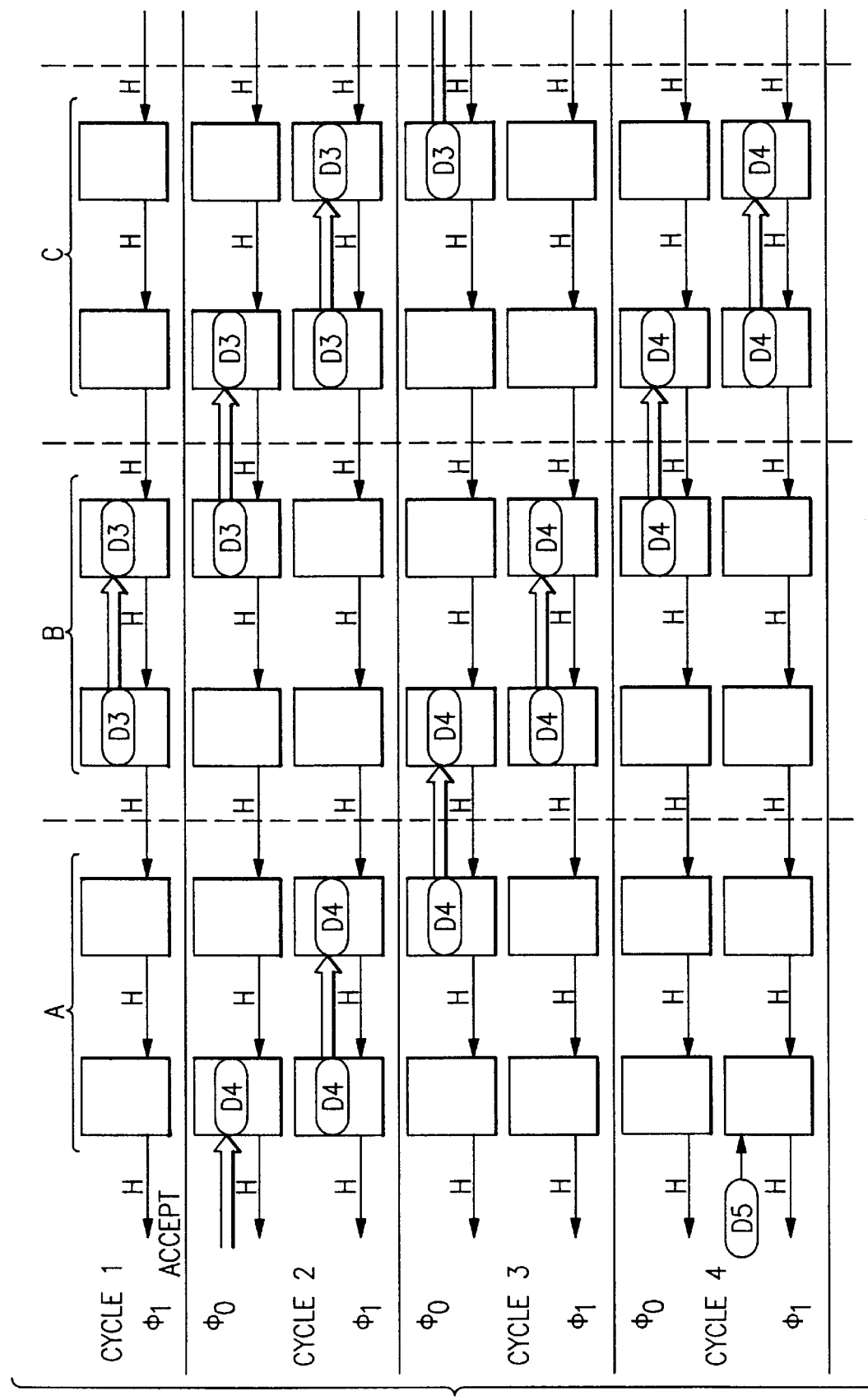
FIGS. 3a, 3b, 3c, and 3d illustrate the control of data transfer between stages of a preferred embodiment of a pipeline using a two-wire interface and a multi-phase clock.
Figure 3B:
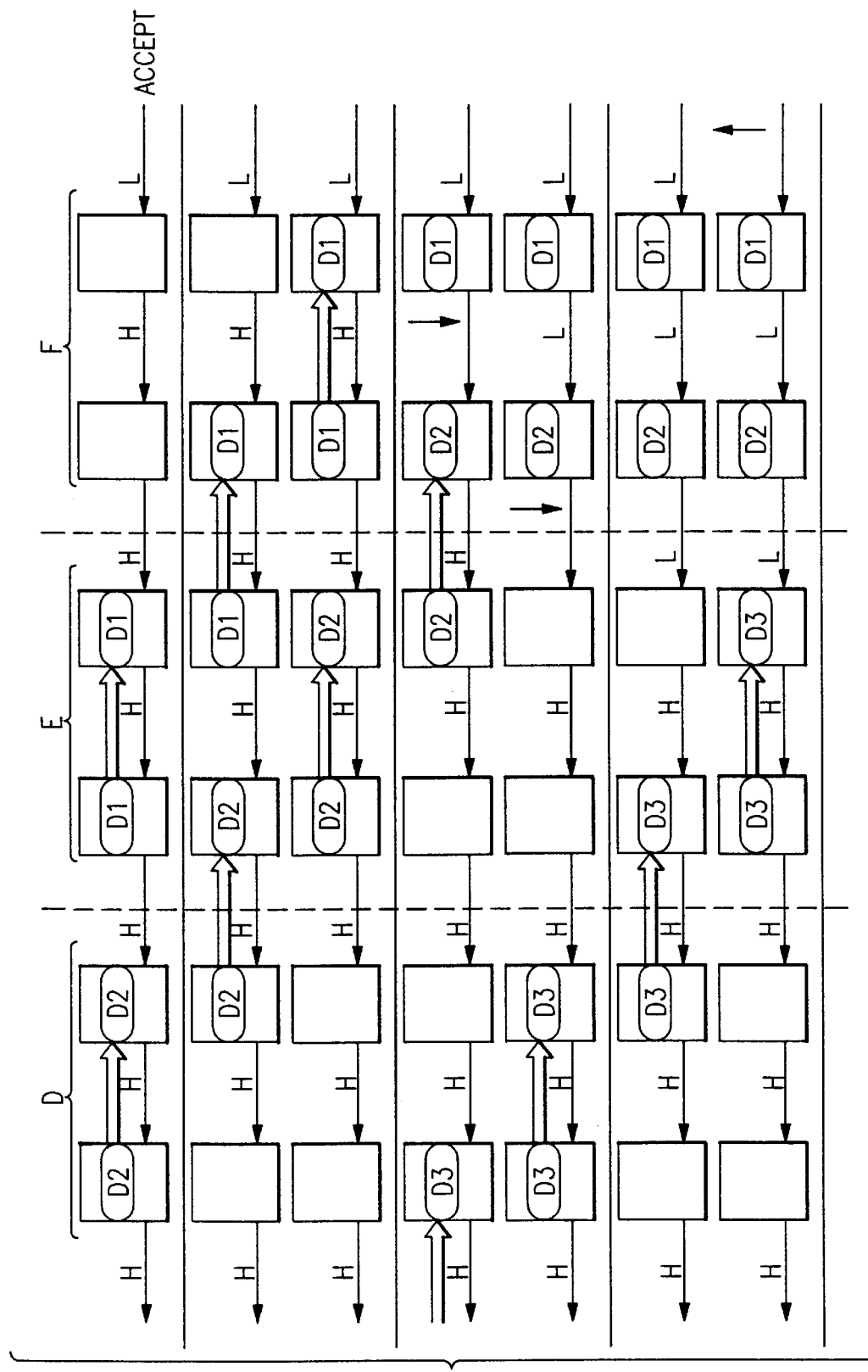
Figure 3C:
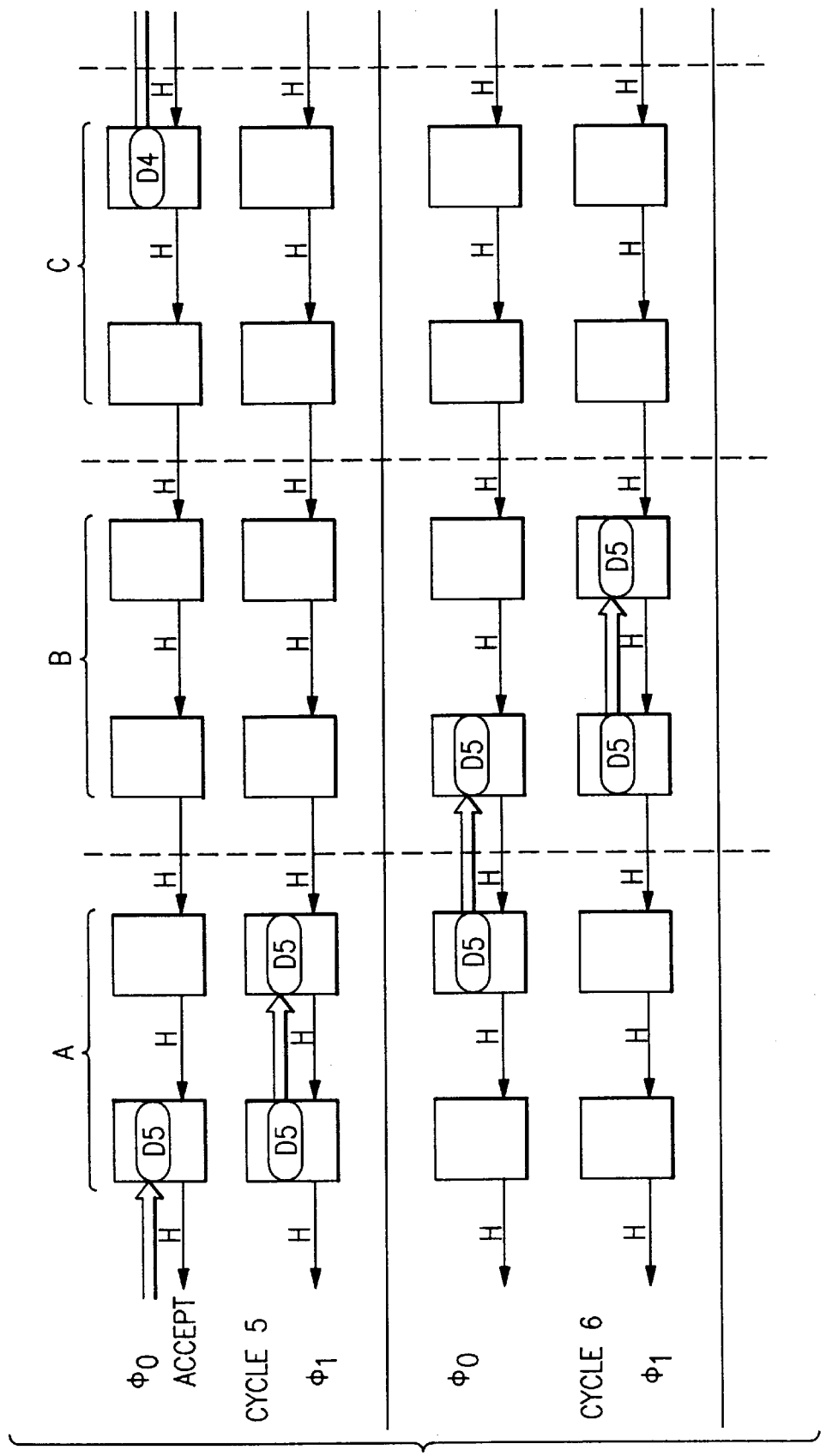
Figure 3D:
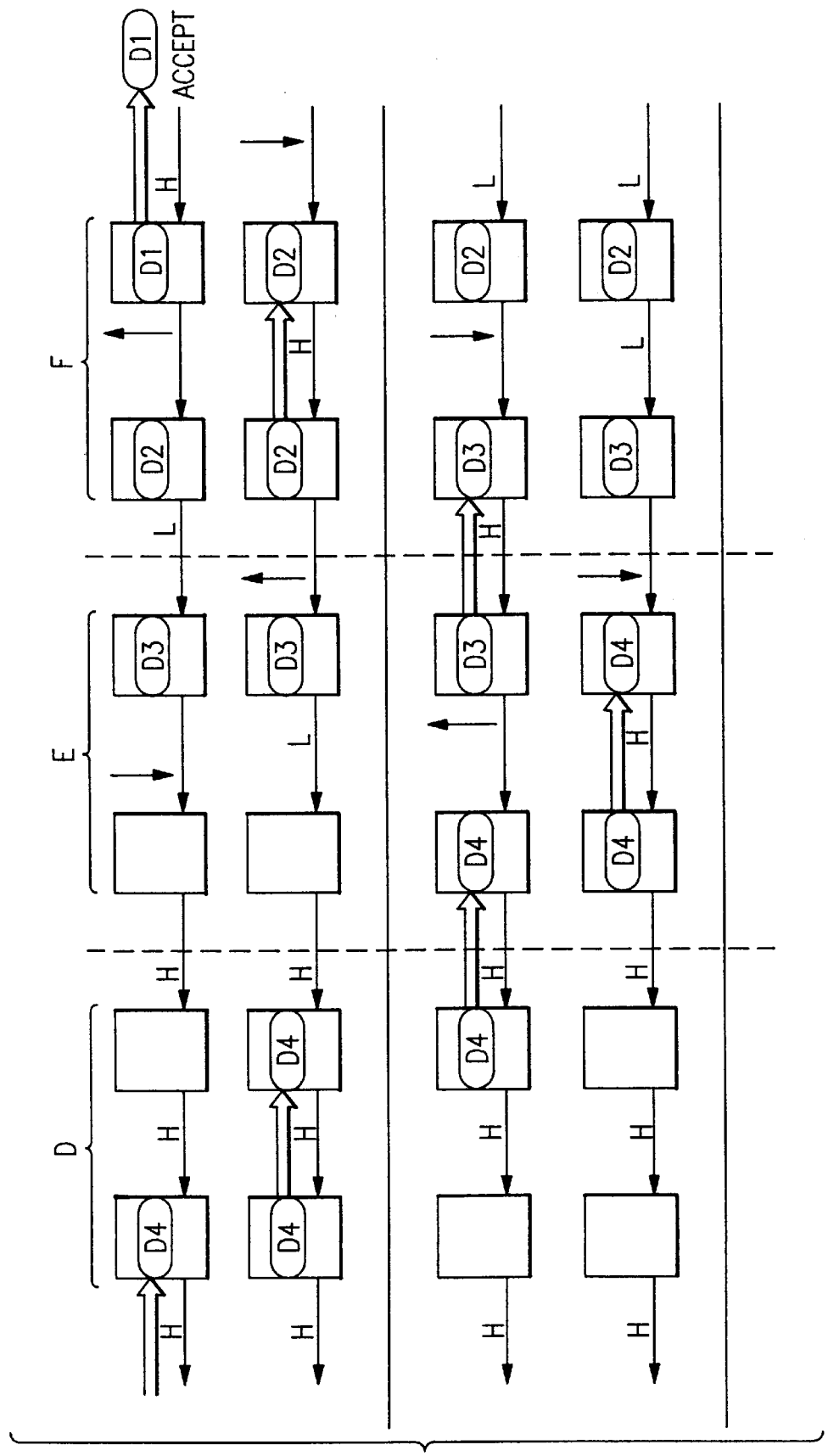

FIGS. 3a–3b (which are referred to collectively as FIG. 3) illustrate generally a preferred embodiment of the pipeline according to the invention. This preferred embodiment implements the structure shown in FIGS. 2a and 2b using a two-phase, non-overlapping clock with phases ø0 and ø1. Although a two-phase clock is preferred, it is also possible to drive the various embodiments of the invention using a clock with more than two phases.

In FIG. 3, each pipeline stage is represented as two separate boxes illustrating the primary and secondary storage elements. Also, although the VALID signal and the data lines connect the various pipeline stages as before, for ease of illustration, only the ACCEPT signal is shown in FIG. 3. Transfer of data from one storage element to another is indicated by a large open arrow. It is assumed that the VALID signal out of the primary or secondary storage elements of any given stage is HIGH whenever the storage elements contain valid data.

In FIG. 3, each cycle is shown as consisting of a full period of the non-overlapping clock phases ø0 and ø1. As is explained in greater detail below, data is transferred from the secondary storage elements (shown as the left box in each stage) to the primary storage elements (shown as the right box in each stage) during lock cycle ø1, whereas data is transferred from the primary storage elements of one stage to the secondary storage elements of the following stage during the clock cycle ø0. FIG. 3 also illustrates that the primary and secondary storage elements in each stage are also connected via an internal acceptance line to pass an ACCEPT signal in the same manner that the ACCEPT signal is passed from stage to stage.

FIG. 3 shows the ø1 phase of Cycle 1, in which data D1, D2, and D3, which were previously shifted into the secondary storage elements of Stages E, D, and B, respectively, are shifted into the primary storage elements of the respective stage. During the ø1 phase of Cycle 1, the pipeline therefore assumes the same configuration as is shown as Cycle 1 in FIGS. 2a and 2b. As before, the ACCEPT signal into stage F is assumed to be LOW. As FIG. 3 illustrates, however, this means that the ACCEPT signal into the primary storage element of Stage F is LOW, but since this storage element does not contain valid data, it sets the ACCEPT signal into its secondary storage element HIGH.

The ACCEPT signal from the secondary storage elements of Stage F into the primary storage elements of Stage E is also set HIGH since the secondary storage elements of stage F do not contain valid data. As before, since the primary storage elements of Stage F are able to accept data, data in all the upstream primary and secondary storage elements can be shifted downstream without any valid data being overwritten. The shift of data from one stage to the next takes place during the next ø0 phase in Cycle 2. For example, the valid data D1 contained in the primary storage element of Stage E is shifted into the secondary storage element of Stage F, the data D4 is shifted into the pipeline, that is, into the secondary storage element of Stage A, etc.

The primary storage element of Stage F still does not contain valid data during the ø0 phase in Cycle 2, so that the ACCEPT signal from the primary storage elements into the secondary storage elements of Stage F remains HIGH. During the ø1 phase in Cycle 2, data can therefore be shifted yet another step to the right, which is from the secondary to the primary storage elements within each stage.

Once valid data is loaded into the primary storage elements of Stage F, however, if the ACCEPT into Stage F from the downstream device is still LOW, it is not possible to shift data out of the secondary storage element of Stage F without overwriting and destroying the valid data D1. The ACCEPT signal from the primary storage elements into the secondary storage, elements of Stage F therefore goes LOW. Data D2, however, can still be shifted into the secondary storage of Stage F since it did not contain valid data and its ACCEPT signal out was HIGH.

During the ø1 phase of Cycle 3, it not possible to shift data D2 into the primary storage elements of Stage F, although data can be shifted within all the previous stages. Once valid data is loaded into the secondary storage elements of Stage F, however, Stage F is not able to pass on this data, which it signals by setting its ACCEPT signal out LOW. Assuming that the ACCEPT signal into stage F remains LOW, data upstream of Stage F can continue to be shifted between stages and within stages on the respective clock phases until the next valid data block D3 reaches the primary storage elements of Stage E. As illustrated, this condition is reached during the ø1 phase of Cycle 4.

During the ø0 phase of Cycle 5, data D3 has been loaded into the primary storage element of Stage E. Since this data cannot be shifted further, the ACCEPT signal out of the primary storage elements of Stage E is set LOW. Upstream data can be shifted as normal.

Assume now as in Cycle 5 of FIGS. 2a and 2b that the device connected downstream of the pipeline is able to accept pipeline data. It signals this by setting the ACCEPT signal into pipeline Stage F HIGH. The primary storage elements of Stage F can now shift data to the right and they are also able to accept new data: the data D1 was shifted out during the ø1 phase of Cycle 5 so that the primary storage elements of Stage F no longer contain data that must be saved. During the ø1 phase of Cycle 5, the data D2 is therefore shifted within Stage F from the secondary storage elements to the primary storage elements. The secondary storage elements of Stage F then are also able to accept new data and signal this by setting the ACCEPT signal into the primary storage elements of Stage E HIGH. During transfer of data within a stage, that is from its secondary to its primary storage elements, both sets of storage elements will contain the same data, but the data in the secondary storage elements can be overwritten with no data loss since this data will also be in the primary storage elements. The same holds for data transfer from the primary storage elements of one stage into the secondary storage elements of a subsequent stage.

Assume now that the ACCEPT signal into the primary storage elements of Stage F goes LOW during the ø1 phase in Cycle 5. This means that Stage F is not able to transfer the data D2 out of the pipeline. Stage F consequently sets the ACCEPT signal from its primary to its secondary storage elements LOW to prevent overwriting of the valid data D2. The data D2 stored in the secondary storage elements of Stage F, however, can be overwritten without loss, and the data D3 is therefore transferred into the secondary storage elements of Stage F during the ø0 phase of Cycle 6. Data D4 and D5 can be shifted downstream as normal. Once valid data D3 is stored in Stage F along with data D2, as long as the ACCEPT signal into the primary storage elements of Stage F is LOW, neither can the secondary storage elements accept new data, and it signals this by setting the ACCEPT signal into Stage E LOW.

When the ACCEPT signal into the pipeline from the downstream device changes from LOW to HIGH or vice versa, this change does not have to propagate upstream within the pipeline farther than to the immediately preceding storage elements (within the same stage or within the preceding pipeline stage); instead, this change propagates upstream within the pipeline one storage element block per clock phase.

As this example illustrates, the concept of a "stage" in the pipeline structure illustrated in FIG. 3 is to some extent a matter of perception. Since data is transferred within a stage (from the secondary to the primary storage elements) as it is between stages (from the primary storage elements of the upstream stage into the secondary storage elements of the neighboring downstream stage), one could just as well consider a stage to consist of "primary" storage elements followed by "secondary storage element" instead of as illustrated in FIG. 3. The concept of "primary" and "secondary" storage elements is also therefore mostly a question of labelling. In FIG. 3, the "primary" storage elements can also be referred to as "output" storage elements, since they are the elements from which data is transferred out of a stage into a following stage or device, and the "secondary" storage elements could be "input" storage elements for the same stage.

In the explanation of the embodiments of the invention shown in FIGS. 1–3, only the transfer of data under the control of the ACCEPT and VALID signals has been mentioned. It is to be understood that each pipeline stage may also process the data it has received arbitrarily before passing it between its internal storage elements or before passing it to the following pipeline stage. Referring once again to FIG. 3, a pipeline stage can therefore be defined as the portion of the pipeline that contains input and output storage elements and that arbitrarily processes data stored in its storage elements.

The "device" downstream from the pipeline Stage F, moreover, need not be some other type of hardware structure, but rather could be another section of the same or even of another pipeline. As is illustrated below, a pipeline stage can set its ACCEPT signal LOW not only when all of the downstream storage elements are filled with valid data, but also when a stage requires more than one clock phase to finish processing its data, or when it creates valid data in one or both of its storage elements. It is also not necessary for a stage simply to pass on the ACCEPT signal based on whether or not the immediately downstream storage elements contains valid data that cannot be passed on. Instead, the ACCEPT signal itself may also be altered within the stage or even by circuitry external to the stage in order to control the passage of data between adjacent storage elements.

A great advantage of the two-wire interface (one wire for each of the VALID and ACCEPT signals) is its ability to control the pipeline without the control signals needing to propagate back up the pipeline all the way to its beginning stage. In the embodiment shown in FIG. 1, Cycle 3, for example, although stage F "tells" stage E that it cannot accept data, and stage E tells stage D, and stage D tells stage C, there is no need for this signal to propagate any farther back along the pipeline. In the embodiment shown in FIG. 3, Cycle 3, the LOW ACCEPT signal is not propagated any father upstream than to Stage E, and even then only to its primary storage elements.

As is described below, the invention is able to achieve this flexibility without adding significantly to the silicon area that is required to implement the design. Typically, each latch in the pipeline may require as little as only one extra transistor (which lays out very efficiently in silicon), two extra one-bit latches, and a small number of gates to process the ACCEPT and VALID signals themselves.

Figure 4:
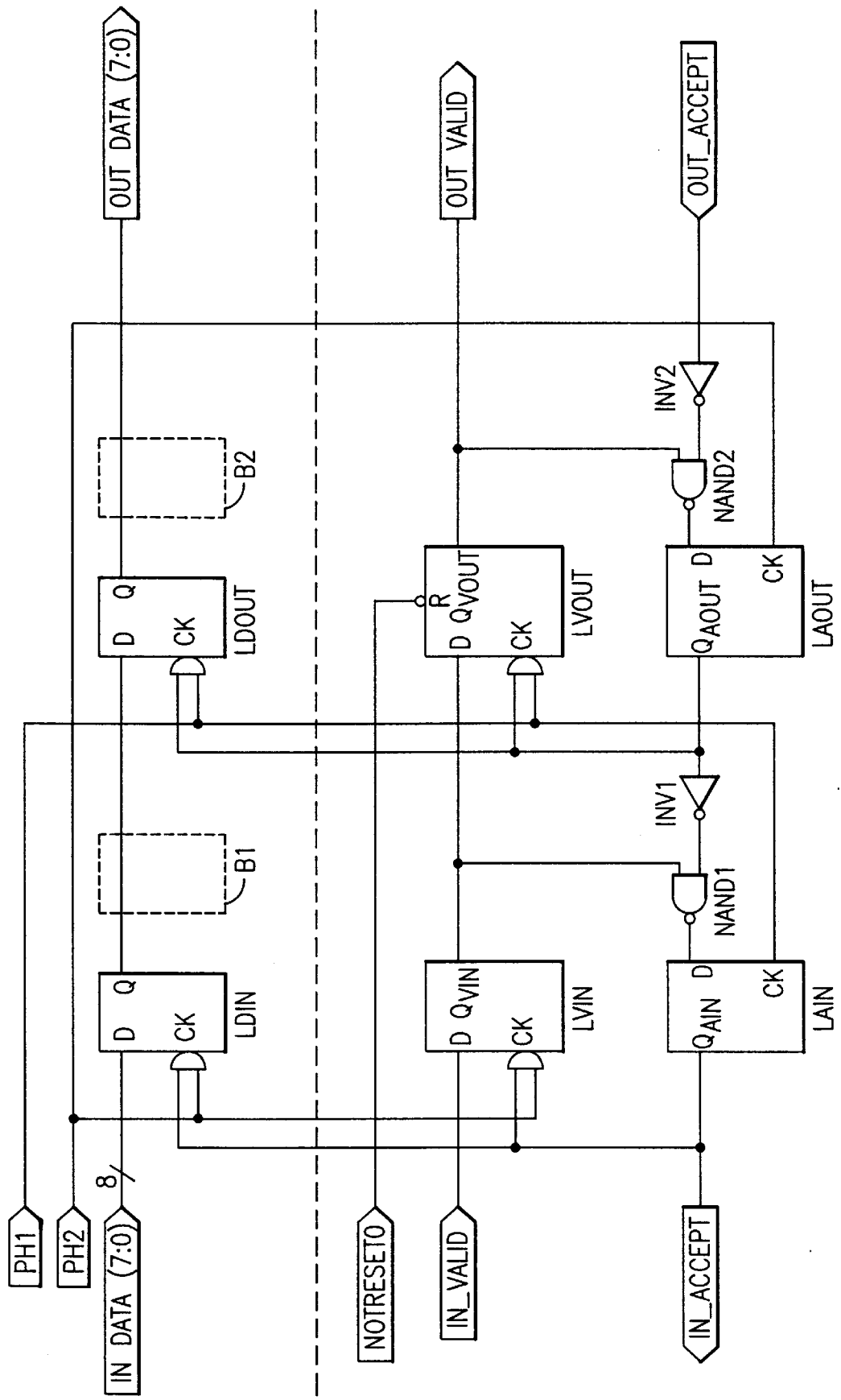
FIG. 4 is a block diagram that illustrates a basic embodiment of a pipeline stage that incorporates the two-wire transfer control according to the preferred embodiment of the invention; two consecutive pipeline processing stages and the two-wire transfer control according to the invention.

FIG. 4 illustrates a hardware structure that implements a stage as shown in FIG. 3.

By way of example only, it is assumed that eight-bit data is to be transferred (with or without further manipulation in optional combinatorial logic circuits) in parallel through the pipeline. The two-wire interface according to the invention is, however, suitable for use with any data bus width, and the data bus width may even change from one stage to the next if a particular application so requires and conventional steps are taken to ensure that no needed data is lost. The interface according to the invention can also be used to process analog signals.

Although other conventional timing arrangements may be used with the invention, the interface is preferably controlled by a two-phase, non-overlapping clock. In FIGS. 4–9, these clock phase signals are referred to as PH0 and PH1. In FIG. 4, a line is shown for each clock phase signal.

Input data enters a pipeline stage over a multi-bit data bus IN_DATA and is transferred to a following pipeline stage or to subsequent receiving circuitry over an output data bus OUT_DATA. The input data is first loaded in a manner described below into a multi-input input latch LDIN, which comprises the secondary storage elements described above.

In the illustrated example of the invention, it is assumed that the Q outputs of all latches follow their D inputs, that is, they are "loaded", when the clock changes from a "0" to a "1" (on the rising edge of the clock). Additionally, the Q outputs hold their last values, or, in other words, the Q outputs are "latched", on the falling edge of their respective clock signals. Each latch has for its clock either one of two non-overlapping clock signals PH0 or PH1 (shown in FIG. 5), or the logical AND combination of one of these clock signals PH0, PH1 and one logic signal. The invention works just as well, however, by providing latches that latch on the falling edges of the clock signals, as long as conventional methods are applied to ensure proper timing of the latching operations.

The output data from the input data latch LDIN passes via an arbitrary and optional combinatorial logic circuit B1, which may be provided to convert output data from input latch LDIN into intermediate data, which is then later loaded in an output data latch LDOUT, which comprises the primary storage elements described above. The output from the output data latch LDOUT may similarly pass through an arbitrary and optional combinatorial logic circuit B2 before being passed onward as OUT_DATA to the next device downstream, which may be another pipeline stage or any other device connected to the pipeline.

Each stage of the pipeline also includes a validation input latch LVIN, a validation output latch LVOUT, an acceptance input latch LAIN, and an acceptance output latch LAOUT. Each of these four latches is preferably a simple, single-stage latch. The outputs from latches LVIN, LVOUT, LAIN and LAOUT are, respectively, QVIN, QVOUT, QAIN, QAOUT. The output signal QVIN from the validation input latch is connected either directly as an input to the validation output latch LVOUT, or via intermediate logic devices or circuits that may alter the signal.

In this and subsequent figures, the data and validation latches are shown as separate devices. This is not necessary; rather, the IN_DATA bus and the input data latch LDIN could simply be expanded by one line and storage element to accommodate the validation signal. The data output latch LDOUT and validation output latch LVOUT of each stage could be similarly combined.

Similarly, The output validation signal QVOUT of a given stage may be connected either directly to the input of the validation input latch QVIN of the following stage, or via intermediate devices or logic circuits, which may even alter the validation signal. This output QVIN is also connected to a logic gate (to be described below), whose output is connected to the input of the acceptance input latch LAIN; the output QAOUT from the acceptance output latch LAOUT is connected to a similar logic gate (described below), optionally via another logic gate.

As FIG. 4 shows, the output validation signal QVOUT forms an OUT_VALID signal that can be received by following stages as an IN_VALID signal, or simply to indicate valid data to subsequent circuitry connected to the pipeline. The readiness of the following circuit or stage to accept data is indicated to each stage as the signal OUT_ACCEPT, which is connected as the input to the acceptance output latch LAOUT, preferably via logic circuitry, which is described below. Similarly, the output QAOUT of the acceptance output latch LAOUT is connected as the input to the acceptance input latch LAIN, preferably via logic circuitry, which is described below.

The output signals QVIN, QVOUT from the validation latches LVIN, LVOUT are combined with the acceptance signals QAOUT, OUT_ACCEPT, respectively, to form the inputs to the acceptance latches LAIN, LAOUT, respectively. In the implementation illustrated in FIG. 4, these input signals are formed as the logical NAND combination of the respective validation signals QVIN, QVOUT with the logical inverse of the respective acceptance output signals QAOUT, OUT_ACCEPT. Conventional logic gates NAND1 and NAND2 perform the NAND operation, and the inverters INV1, INV2 form the logical inverses of the respective acceptance signals.

As is well known in the art of digital design, the output from a NAND gate is a logical "1" when any or all of its input signals are in the logical "0" state. The output from a NAND gate is therefore a logical "0" only when all of its inputs are in the logical "1" state. Also well known is that the output of a digital inverter such as INV1 is a logical "1" when its input signal is a "0" and is a "0" when its input signal is a "1".

The inputs to the NAND gate NAND1 are therefore: QVIN and NOT(QAOUT), where "NOT" indicates binary inversion. Using known techniques, the input to the acceptance latch LAIN can be resolved as follows:

NAND(QVIN,NOT(QAOUT))=NOT(QVIN) OR QAOUT

In other words, the combination of the inverter INV1 and the NAND gate NAND1 is a logical "1" either when the signal QVIN is a "0" or the signal QAOUT is a "1", or both. The gate NAND1 and the inverter INV1 can therefore be implemented by a single OR gate that has one of its inputs tied directly to the QAOUT output of the acceptance latch LAOUT and its other input tied to the inverse of the output signal QVIN of the validation input latch LVIN.

As is well known in the art of digital design, many latches suitable for use as the validation and acceptance latches may have two outputs, Q and NOT(Q), that is, Q and its logical inverse. If such latches are chosen, the one input to the OR gate can therefore be tied directly to the NOT(Q) output of the validation latch LVIN. The gate NAND1 and the inverter INV1 can be implemented using well-known, conventional techniques. Depending on the latch architecture used, however, it may be more efficient to use a latch without an inverting output, and to provide instead the gate NAND1 and the inverter INV1, both of which also can be implemented efficiently in a silicon device.

The clock or enable signal CK of the data and validation latches LDIN, LDOUT, LVIN, LVOUT assumes the logical "1" state when both the clock phase signal (PH0 at the input side and PH1 at the output side) is a "1" and the output from the acceptance latch of the same side is a "1". Thus, PH0 is used to form the logical AND clock inputs of latches LDIN and LVIN, whereas PH1 is connected to the AND clock inputs of LDOUT and LVOUT. The other of the two inputs to the AND gates for the clock signals CK of the data and validation latches on either side is connected to the output from the acceptance latch of the same stage.

In particular applications, such as CMOS implementations of the latches, the logical AND operation that controls the loading (via the illustrated CK or enabling "input") of the latches can be implemented easily in a conventional manner by connecting the respective enabling input signals (for example, PH0 and QAIN for the latches LVIN and LDIN), to the gates of MOS transistors connected in series in the input lines of the latches. It is then not necessary to provide an actual logic AND gate, which might cause problems of timing due to propagation delay in high-speed applications. The AND gate shown in the figures therefore only indicates the logical function to be performed in generating the enable signals of the various latches.

The data latch LDIN thus loads input data only when PH0 and QAIN are both "1". It will latch this data when either of these two signals goes to a "0".

Although only one of the clock phase signals PH0, PH1 is used to clock the data and validation latches at the input (and output) side of the pipeline stage, the other of the clock phase signals is used, directly, to clock the acceptance latch at the same side. In other words, the acceptance latch on either side (input or output) of a pipeline stage is preferably clocked "out of phase" with the data and validation latches on the same side. For example, PH1 is used to clock the acceptance input latch, although PH0 is used in generating the clock signal CK for the data latch LDIN and the validation latch LVIN.

As an example of the operation of a pipeline augmented by the two-wire validation and acceptance circuitry according to the invention, assume that no valid data is initially presented at the input to the circuit, either from a preceding pipeline stage, or from a transmission device. In other words, assume that the validation input signal IN_VALID the illustrated stage has not gone to a "1" since the system was most recently reset. Assume also that several clock cycles have taken place since the system was last reset so that the circuitry has reached a steady-state condition. The validation input signal QVIN from the validation latch LVIN is therefore loaded as a "0" during the next positive period of the clock PH0. The input to the acceptance input latch LAIN (via the gate NAND1 or another equivalent gate), is therefore loaded as a "1" during the next positive period of the clock signal PH1. In other words, since the data in the data input latch LDIN is not valid, the stage signals that it is ready to accept input data (since it does not hold any data worth saving).

In this example, note that the signal IN_ACCEPT is used to enable the data and validation latches LDIN and LVIN. Since the signal IN_ACCEPT at this time is a "1", these latches effectively work as conventional transparent latches so that whatever data is on the IN_DATA bus is simply loaded into the data latch LDIN as soon as the clock signal PH0 goes to a "1". Of course, this invalid data will also be loaded into the next data latch LDOUT of the following pipeline stage as long as the output QAOUT from its acceptance latch is a "1".

In other words, as long as a data latch does not contain valid data, it accepts or "loads" any data presented to it during the next positive period of its respective clock signal. On the other hand, such invalid data is not loaded in any stage for which the acceptance signal from its corresponding acceptance latch is low (that is, a "0"). Furthermore, the output signal from a validation latch (which forms the validation input signal to the subsequent validation latch) remains a "0" as long as the corresponding IN_VALID (or QVIN) signal to the validation latch is low.

When the input data to a data latch is valid, the validation signal IN_VALID indicates this by rising to a "1". The output of the corresponding validation latch then rises to a "1" on the next rising edge of its respective clock phase signal. For example, the validation input signal QVIN of latch LVIN rises to a "1" when its corresponding IN_VALID signal goes high (that is, rises to a "1") on the next rising edge of the clock phase signal PH0.

Assume now, instead, that the data input latch LDIN contains valid data. If the data output latch LDOUT is ready to accept new data, its acceptance signal QAOUT will be a "1". In this case, during the next positive period of the clock signal PH1, the data latch LDOUT and validation latch LVOUT will be enabled, and the data latch LDOUT will load the data present at its input. This will occur before the next rising edge of the other clock signal PH0, since the clock signals are non-overlapping. At the next rising edge of PH0, the preceding data latch (LDIN) will therefore not latch in new input data from the preceding stage until the data output latch LDOUT has safely latched the data transferred from the latch LDIN.

The same sequence is followed by every adjacent pair of data latches (within a stage or between adjacent stages) that are able to accept data, since they will be operating based on alternate phases of the clock. Any data latch that is not ready to accept new data because it contains valid data that cannot yet be passed on will have an output acceptance signal (the QA output from its acceptance latch LA) that is LOW, and its data latch LDIN or LDOUT will not be loaded. In other words, as long as the acceptance signal (the output from the acceptance latch) of a given stage or side (input or output) of a stage is LOW, its corresponding data latch will not be loaded.

FIG. 4 also shows a reset feature included in the preferred embodiment of the invention. In the illustrated example, a reset signal NOTRESET0 is connected to an inverting reset input R (inversion is hereby indicated by a small circle, as is conventional) of the validation output latch LVOUT. As is well known, this means that the validation latch LVOUT will be forced to output a "0" whenever the reset signal NOTRESET0 becomes a "0". One advantage of resetting the latch when the reset signal goes low (becomes a "0") is that a break in transmission will reset the latches; they will then be in their "null" or reset state whenever a valid transmission begins and the reset signal goes HIGH. The reset signal NOTRESET0 therefore operates as a digital "ON/OFF" switch, such that it must be at a HIGH value in order to activate the pipeline.

Note that it is not necessary to reset all of the latches that hold valid data in the pipeline. In FIG. 4, the validation input latch LVIN is not directly reset by the reset signal NOTRESET0, but rather is reset indirectly. Assume that the reset signal NOTRESET0 drops to a "0". The validation output signal QVOUT then also drops to a "0", regardless of its previous state, whereupon the input to the acceptance output latch LAOUT (via the gate NAND1) goes HIGH. The acceptance output signal QAOUT then also rises to a "1". This QAOUT value of "1" is then transferred as a "1" to the input of the acceptance input latch LAIN regardless of the state of the validation input signal QVIN. The acceptance input signal QAIN then rises to a "1" at the next rising edge of the clock signal PH1. Assuming that the validation signal IN_VALID has been correctly reset to a "0", then upon the subsequent rising edge of the clock signal PH0, the output from the validation latch LVIN will become a "0", as it would have done if it had been reset directly.

As this example illustrates, it is only necessary to reset the validation latch in only one side of each stage (including the final stage) in order to reset all validation latches. In fact, in many applications, it will not even be necessary to reset every other validation latch: If the reset signal NOTRESET0 can be guaranteed to be low during more than one complete cycle of both phases PH0, PH1 of the clock, then the "automatic reset" (a backwards propagation of the reset signal) will occur for validation latches in preceding pipeline stages. Indeed, as long as the reset signal is held low for at least as many as full cycles of both phases of the clock as there are pipeline stages, it would only be necessary to reset directly the validation output latch in the final pipeline stage.

Figure 5A:
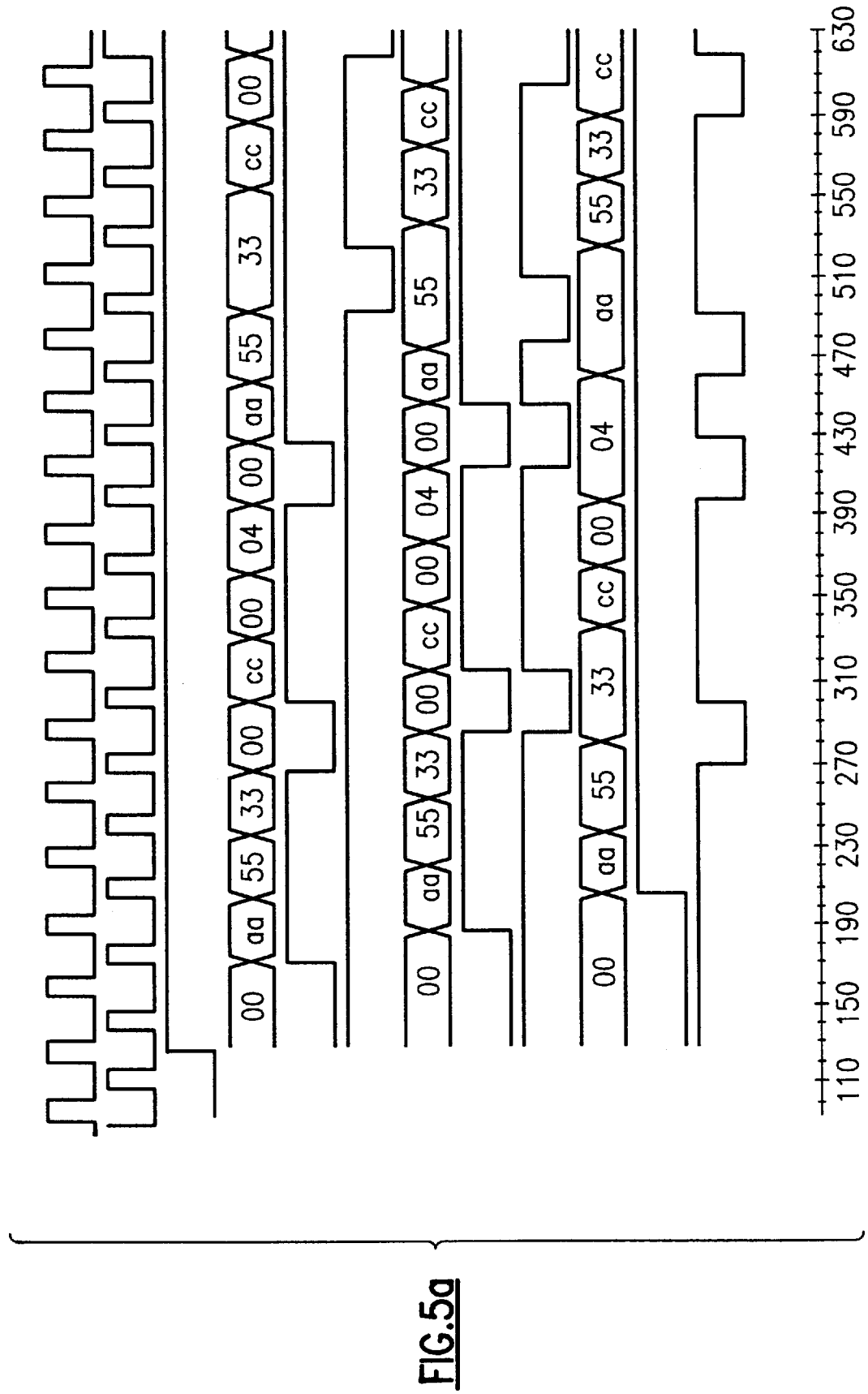
FIGS. 5a and 5b together are an example of a timing diagram that shows the relationship between timing signals, input and output data, and internal control signals used in the pipeline stage shown in FIG. 4.
Figure 5B:
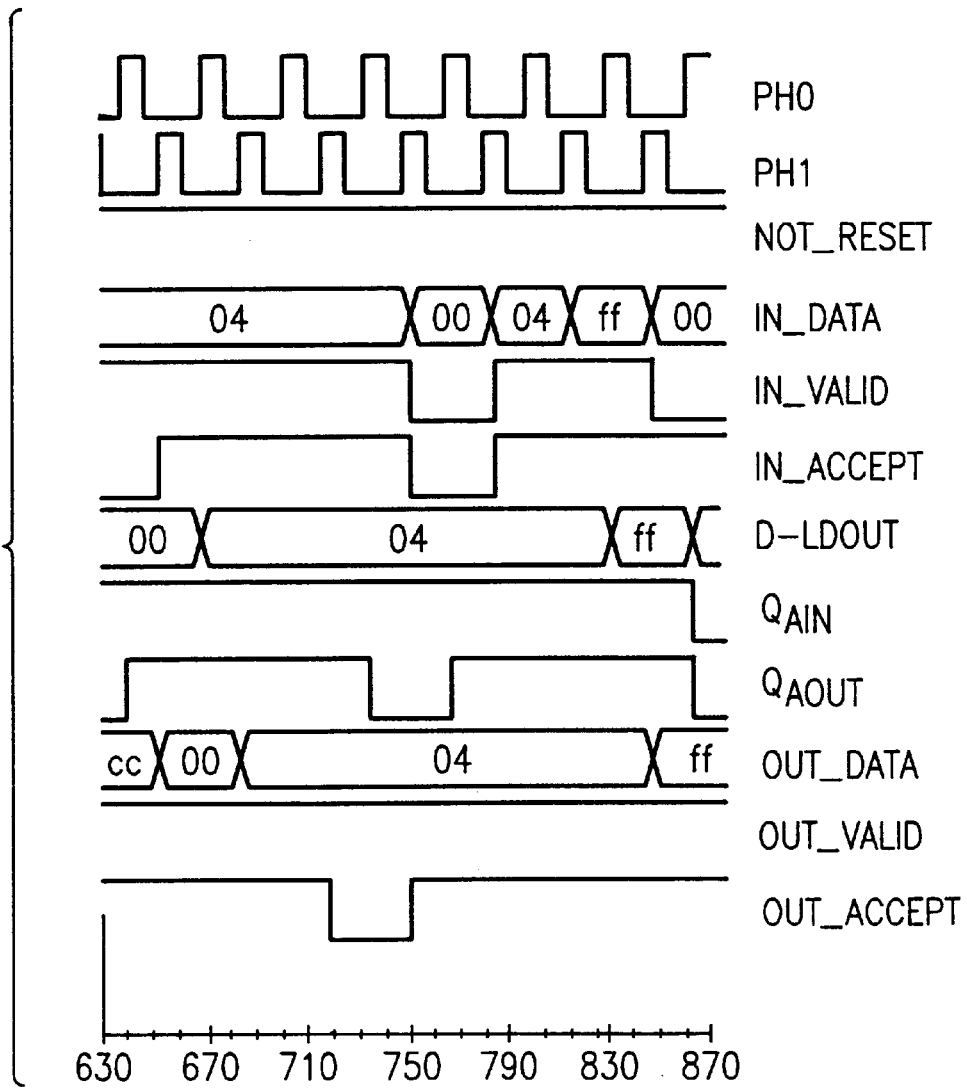

FIGS. 5a and 5b (referred to collectively as FIG. 5) illustrate a timing diagram showing the relationship between the non-overlapping clock signals PH0, PH1, the effect of the reset signal, and the holding and transfer of data for the different permutations of validation and acceptance signals into and between the two illustrated sides of a pipeline stage configured as in the embodiment shown in FIG. 4. In the example illustrated in the timing diagram of FIG. 5, it has been assumed that the outputs from the data latches LDIN, LDOUT are passed without further manipulation by intervening logic blocks B1, B2. This is by way of example only, and it is to be understood that any combinatorial logic structures may be included between the data latches of consecutive pipeline stages, or between the input and output sides of a single pipeline stage. The actual illustrated values for the input data (for example the HEX data words "aa" or "04") are also merely illustrative. As is mentioned above, the input data bus may have any width (and may even be analog), as long as the data latches or other storage devices are able to accommodate and latch or store each bit or value of the input word.

Preferred Data Structure—"tokens"

In the simple application shown in FIG. 4, each stage processes all input data, since there is no control circuitry that excludes any stage from allowing input data to pass through its combinatorial logic block B1, B2, etc. To provide greater flexibility and speed, this invention includes a data structure in which "tokens" are used in our chips to distribute data around the system. Each token consists of a series of binary bits separated into one or more blocks of token words and into one of three types: address bits (A), data bits (D), and an extension bit (E). Assuming by way of example only that data is transferred as words over an 8-bit bus with a 1-bit extension bit line, an example of a four-word token is, in order of transmission:

| First word:  | E | A | A | A | D | D | D | D | D |
|---|---|---|---|---|---|---|---|---|---|
| Second word: | E | D | D | D | D | D | D | D | D |
| Third word:  | E | D | D | D | D | D | D | D | D |
| Fourth word: | E | D | D | D | D | D | D | D | D |

Note that the extension bit E is used as an addition (preferably) to each data word and that the address field can be of variable length and is preferably transmitted just after the extension bit of the first word.

Tokens thus consist of one or more words of (binary) digital data. Each of these words is transferred in sequence and preferably in parallel, although this method of transfer is not necessary: serial data transfer is also possible using known techniques.

As the example illustrates, each token has, preferably at the start, an address field (the string of A-bits) that identifies the type of data that is contained in the token. In many applications, a single word or part of a word is enough to transfer the entire address field, but this is not necessary according to the invention as long as logic circuitry is included in the corresponding pipeline stages that is able to store some representation of partial address fields long enough for the stages to receive and decode the entire address field.

Note that no dedicated wires or registers are required to transmit the address field—it is transmitted using the data bits. As is explained below, a pipeline stage will not be slowed down if it is not intended to be activated by the particular address field; the stage will be able to pass along the token without delay.

The remainder of the data in the token after the address field is not constrained by the use of tokens. These D-data bits may take on any values and the meaning attached to these bits is of no importance here. The number of data bits D appended after the address field can be as long or as short as required, and the number of data words in different tokens may vary greatly. The address field and extension bit are used to convey control signals to the pipeline stages. Because the number of words in the data field (the string of D bits) can be arbitrary, as can be the information conveyed in the data field. The explanation below is therefore directed to the use of the address and extension bits.

Tokens are a particular useful data structure when a number of blocks of circuitry are connected together in a relatively simple configuration. The simplest configuration is a pipeline of processing steps, for example, the one shown in FIG. 1. Assume once again that each box represents a complete pipeline stage.

In the pipeline of FIG. 1, data flows from left to right in the diagram. Data enters the machine and passes into processing Stage A. This may modify the data and it then passes the data, modified or unmodified, to Stage B. The modification may be arbitrarily complicated and in general there will not be the same number of data items flowing into any stage as flow out. Stage B modifies the data again and passes it onto Stage C, etc. In a scheme such as this it is impossible for data to flow in the opposite direction, so that, for example, Stage C cannot pass data to Stage A for example. This restriction is often perfectly acceptable.

On the other hand, it is very desirable for Stage A to be able to communicate information to Stage C even though there is no direct connection between the two blocks, but only via Stage B. One advantage of the tokens is their ability to achieve this kind of communication. Any processing stage that does not recognize a token passes it on unaltered to the next block.

According to the invention, an extension bit is transmitted along with the address and data fields in each token so that a processing stage can pass on a token (which can be of arbitrary length) without having to decode its address at all. According to the invention, any token in which the extension bit is HIGH (a "1") is followed by a subsequent word which is part of the same token. This word also has an extension bit, which indicates whether there is a further token word in the token. When a stage encounters a token word whose extension bit is LOW (a "0") then it is known to be the last word of the token. The next word is then assumed to be the first word of a new token.

Note that although the simple pipeline of processing stages is particularly useful, tokens may be applied to more complicated configurations of processing elements. An example of such a more complicated processing element is described below.

It is not necessary according to the invention to use the state of the extension bit to signal the last word of a given token by giving it an extension bit set to "0". One alternative to the preferred scheme is to move the extension bit so that it indicates the first word of a token instead of the last, with appropriate changes in the decoding hardware.

The advantage of using the extension bit to signal the last word in a token rather than the first is that it is often useful to modify the behavior of a block of circuitry depending upon whether or not a token has extension bits. An example of this would a token that activates a stage that processes video quantization values stored in a quantization table (typically a memory device), for example, a table containing 64 eight-bit arbitrary binary integers.

In order to load a new quantization table into the quantizer stage of the pipeline, a "QUANT_TABLE" token is sent to the quantizer. In such a case the token would for example consist of 65 token words, the first of which would contain the code "QUANT_TABLE" (which could be the digital address in the video system for the memory device containing the table), followed by 64 words, which are the integers of the quantization table.

When encoding video data it is occasionally necessary to transmit such a quantization table. In order to do this, a QUANT_TABLE token with no extension words can be sent to the quantizer stage. on seeing this token, and noting that the extension bit of its first word is LOW, the quantizer stage can read out its quantization table and construct a QUANT_TABLE token which includes the 64 quantization table values. This proceeds in the normal way through the system and is encoded into the bit stream.

Continuing with the example, the quantizer may either load a new quantization table into its own memory device or read out its table depending on whether the first word of the QUANT_TABLE token has its extension bit set or not.

The choice of whether to use the extension bit to signal the first or last token word in a token will therefore depend on the system in which the pipeline will be used. Both alternatives are possible according to the invention.

Another alternative to the preferred extension bit scheme is be to include a length count at the start of the token. Such an arrangement may, for example, be efficient if a token is very long. For example, assume that a typical token in a given application is 1000 words long. Using the illustrated extension bit scheme (with the bit attached to each token word), the token would require 1000 additional bits to contain all the extension bits. Only ten bits would be required, however, to encode the token length in binary form.

Although there are therefore uses for long tokens, experience has shown that there are very many uses for short tokens. Here the preferred extension bit scheme is advantageous. If a token is only one word long then only one bit is required to signal this but a counting scheme would typically require the same ten bits as before.

Disadvantages of a length count scheme include the following: 1) it is inefficient for short tokens; 2) it places a maximum length restriction on a token (with only ten bits, no more than 1023 words can be counted); 3) the length of a token must be known in advance of generating the count (which is presumably at the start of the token); 4) every block of circuitry that deals with tokens would need to be provided with hardware to count words; and 5) if the count should get corrupted (due to a data transmission error) then it is not clear that recovery can ever be achieved.

The advantages of the extension bit scheme according to the invention include: 1) no pipeline stage needs to include a block of circuitry that decodes every token—unrecognized tokens can be passed on correctly by considering only the extension bit; 2) the coding of the extension bit is identical for all tokens; 3) there is no limit placed on the length of a token; 4) the scheme is efficient (in terms of overhead to represent the length of the token) for short tokens; and 5) error recovery is naturally achieved: if an extension bit is corrupted then one random token will be generated (for an extension bit corrupted from "1" to "0") or a token will be lost (extension bit corrupted "0" to "1"); furthermore, the problem is localized to the tokens concerned—after this, correct operation is resumed automatically.

The length of the address field of may be varied. This is highly advantageous since it allows the most common tokens to be squeezed into the minimum number of words. This in turn is of great importance in video data pipeline systems since it ensures that all processing stages can be continuously running at full bandwidth.

According to the invention, in order to allow variable length address fields the addresses are chosen so that a short address followed by random data can never be confused with a longer address. The preferred technique for encoding the address field (which also serves as the "code" for activating an intended pipeline stage) is the well-known technique first described by Huffman, hence the common name "Huffman Code".

Although Huffman encoding is well understood in the field of digital design, the following example provides a general background:

Huffman codes consist of words made up of a string of symbols (in the context of digital systems such as this invention, the symbols are usually binary digits). The code words may have variable length and the special property of Huffman code words is that a code word is chosen so that none of the longer code words starts with the symbols that form a shorter code word. According to the invention, token address fields are preferably (although not necessarily) chosen using known Huffman encoding techniques.

Also according to the invention, the address field preferably starts in the most significant bit (MSB) of the first word token. (Note that the designation of the MSB is arbitrary and that the invention can be modified to accommodate various designations of the MSB.) The address field continues through contiguous bits of lesser significance. If, in a given application, a token address requires more than one token word, the least significant bit in any given word the address field will continue in the most significant bit of the next word. The minimum length of the address field is one bit.

Any of several known hardware structures can be used to generate the tokens used in the invention. One such structure is a microprogrammed state machine, but known microprocessors or other devices may also be used.

The principle advantage of the token scheme according to the invention is its adaptability to unanticipated needs. For example, if a new token is introduced then it is most likely that this will affect only a small number of pipeline stages. The most likely case is when only two stages or blocks of circuitry are affected—the one block that generates the tokens in the first place and the block or stage that has been newly designed or modified to deal with this new token. Note that it is not necessary to modify any other pipeline stages; rather, these will be able to deal with the new token without modification to their designs because they will not recognize it and will pass that token on unmodified.

This ability of the invention to leave substantial existing designed devices unaffected has clear advantages. It may be possible to leave some semiconductor chips in a chip set completely unaffected by a design improvement in some other chips in the set. This is advantageous both from the perspective of a customer and from that of a chip manufacturer. Even if modifications mean that all chips are affected by the design change (a situation that becomes increasingly likely as levels of integration progress so that the number of chips in a system drops) there will still be the considerable advantage of better time-to-market than can be achieved, since the same design can be reused.

In particular, note the situation that occurs when it becomes necessary to extend the token set to include two word addresses. Even in this case it is still not necessary to modify an existing design. Token decoders in the pipeline stages will attempt to decode the first word of such a token and will conclude that it does not recognize the token. It will then pass on the token unmodified using the extension bit to correctly do this. It will not attempt to decode the second word of the token (even though this contains address bits) because it will "assume" that the second word is part of the data field of a token that it does not recognize.

In many cases, a pipeline stage or a connected block of circuitry will modify a token. This usually, but not necessarily, takes the form of modifying the data field of a token. In addition, it is common for the number of data words in the token to be modified, either by removing certain data words or by adding new ones. In some cases tokens are removed entirely from the token stream.

In most applications, pipeline stages will typically only decode (be activated by) a few tokens; the stage does not recognize other tokens and passes them on unaltered. In a large number of cases, only one token is decoded: the data token word itself.

In many applications, the operation of a particular stage will depend upon the results of its own past operations. The "state" of the stage thus depends on its previous states. In other words, the stage depends upon stored state information, which is another way of saying it must retain some information about its own history one or more clock cycles ago. The invention is well-suited for use in pipelines that include such "state machine" stages as well as for the applications in which the latches in the data path are simple pipeline latches.

The suitability of the two-wire interface according to the invention in such "state machine" circuits is a significant advantage of the invention. Especially where a data path is being controlled by a state machine, the two-wire interface technique according to the invention may be used to ensure that the "current state" of the machine stays in step with the data which it is controlling in the pipeline.

Figure 6:
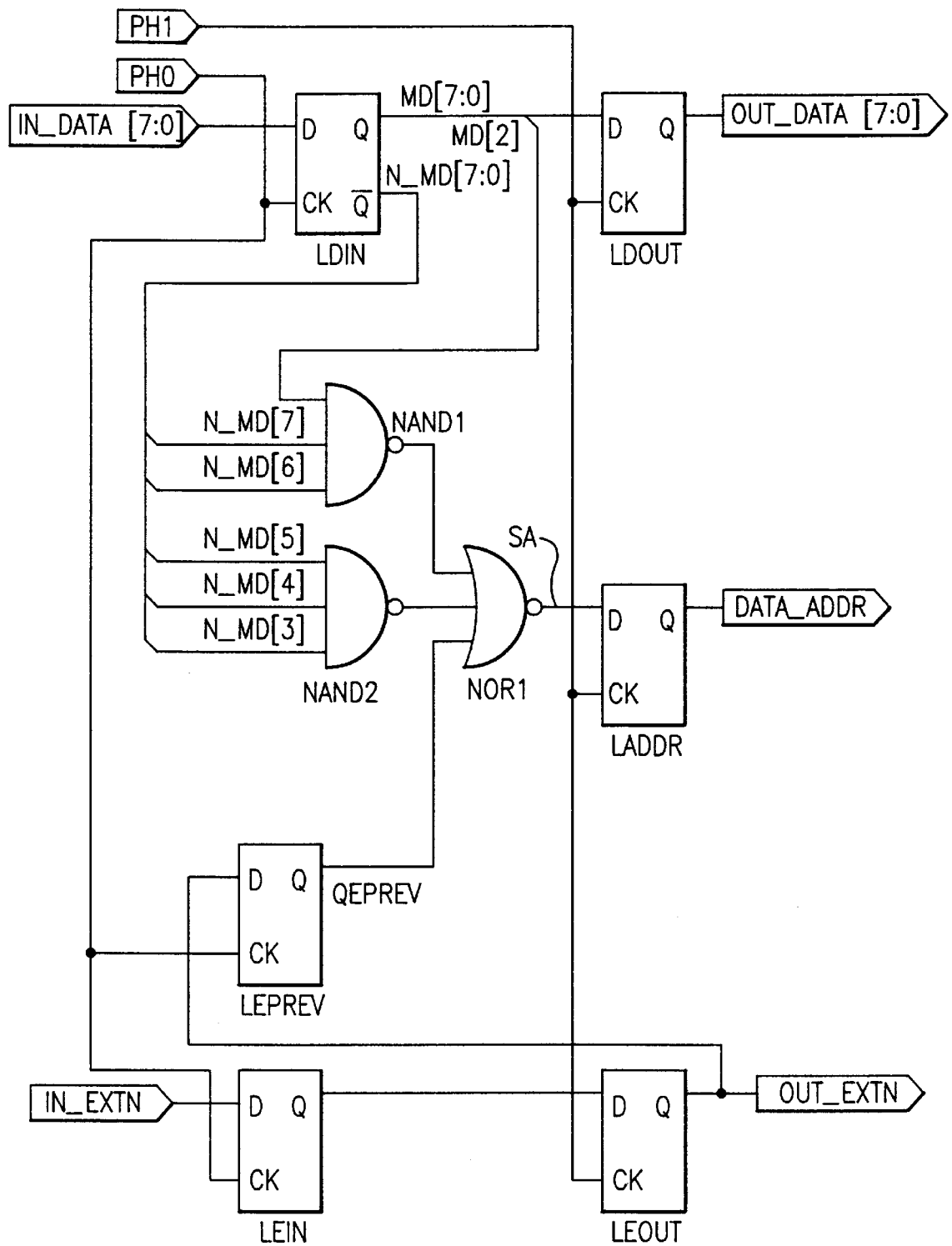
FIG. 6 is a block diagram of an example of a pipeline stage according to the invention that holds its state under the control of an extension bit.

FIG. 6 is a simplified block diagram of an example of circuitry included in a pipeline stage for decoding a token address field; this illustrates a pipeline stage that has the characteristics of a "state machine". Each word of a token includes an "extension bit" which is HIGH if there are more words in the token or LOW if this is the last word of the token. If this is the last word of a token then the next valid data word is the start of a new token and therefore its address must be decoded. The decision as to whether or not to decode the token address in any given word thus depends upon knowing the value of the previous extension bit.

For the sake of simplicity only, the two-wire interface (with the acceptance and validation signals and latches) is not illustrated and all details to do with resetting the circuit are omitted. As before, an 8-bit data word is assumed by way of example only.

This exemplifying pipeline stage delays the data bits and the extension bit by one pipeline stage. It also decodes the DATA token and at the point when the first word of the DATA token is presented at the output of the circuit the signal "DATA_ADDR" is created and set HIGH. The data bits are delayed by the latches LDIN and LDOUT, each of which is repeated eight times for the eight data bits used in this example (corresponding to an 8-input, 8-output latch). Similarly the extension bit is delayed by extension bit latches LEIN and LEOUT.

In this example, the latch LEPREV is provided to store the most recent state of the extension bit. The value of the extension bit is loaded into LEIN and is then loaded into LEOUT on the next rising edge of the non-overlapping clock phase signal PH1. Latch LEOUT thus contains the value of the current extension bit, but only during the second half of the non-overlapping, two-phase clock. Latch LEPREV, however, loads this extension bit value on the next rising edge of the clock signal PH0, that is, the same signal that enables the extension bit input latch LEIN. The output QEPREV of the latch LEPREV thus will hold the value of the extension bit during the previous PH0 clock phase.

The five six bits of the data word output from the inverting Q output, plus the non-inverted MD[2], of the latch LDIN are combined with the previous extension bit value QEPREV in a series of logic gates NAND1, NAND2, and NOR1, whose operations are well known in the field of digital design. The designation "N_MD[m] indicates the logical inverse of bit m of the mid-data word MD[7:0]. Using known techniques of Boolean algebra it can be shown that the output signal SA from this logic block (the output from NOR1) is HIGH (a "1") only when the previous extension bit is a "0" (QPREV="0") and the data word at the output of the non-inverting Q latch (the original input word) LDIN has the structure "000001xx", that is, the five high-order bits MD[7]-MD[3] bits are all "0" and the bit MD[2] is a "1" and the bits in the zero-one positions have any arbitrary value.

There are thus four possible data words (there are four permutations of "xx") that will cause SA, and, thus the output of the address signal latch LADDR to whose input SA is connected, to become HIGH. In other words, this stage provides an activation signal (DATA_ADDR="1") only when one of the four possible proper tokens is presented and only when the previous extension bit was a zero, that is, the previous data word was the last word in the previous series of token words, which means in turn that the present token word is the first one in the present token.

When the signal QPREV from latch LEPREV is LOW, the value at the output of the latch LDIN is therefore the first word of a new token. The gates NAND1, NAND2, and NOR1 decode the DATA token (000001xx). This address decoding signal SA is, however, then delayed in latch LADDR so that the signal DATA_ADDR has the same timing as the output data OUT_DATA and OUT_EXTN.

In th embodiment shown in FIG. 6, circuitry is included to decode token words. Similar circuitry could be included as intermediate combinatorial circuitry (such as B1 in FIG. 4) not just to decode particular token words, but to detect and/or correct errors in data words. The processing operation performed by such a stage would be to analyze the data word in the input data latch (LDIN) and then either to generate a signal indicating correctness (possibly using the validation signal itself) or even to change incorrect data bits to their correct values before passing the word on to the data output latch (LDOUT). Such a stage could operate independently of token activation, or it could be included in a pipeline that processes token information.

Figure 7:
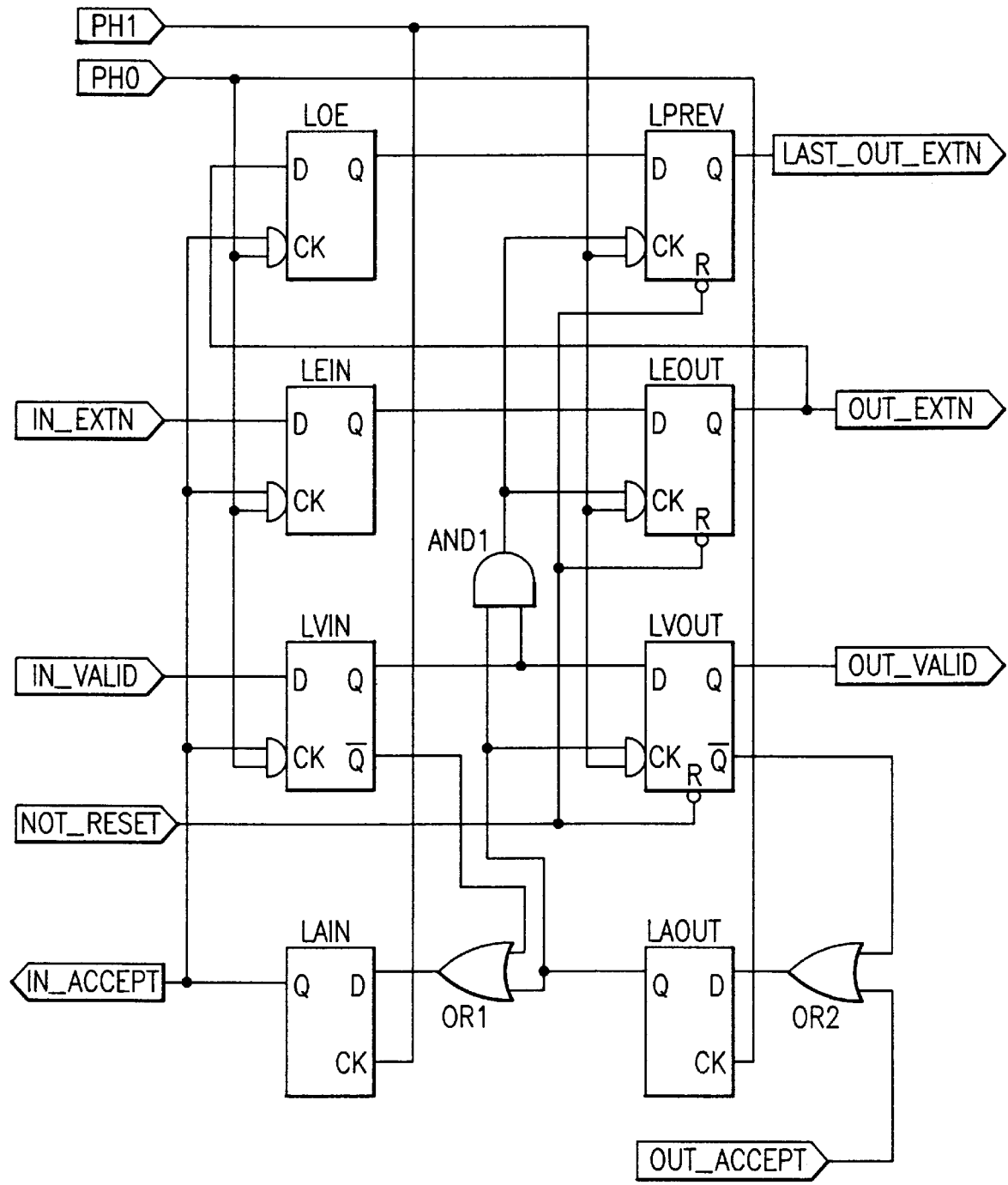
FIG. 7 is a block diagram of a pipeline stage that decodes stage activation data words.

FIG. 7 is another simple example of a state-dependent pipeline stage that generates the signal LAST_OUT_EXTN to indicate the value of the previous output extension bit OUT_EXTN. One of the two enabling signals (at the CK inputs) to the present and last extension bit latches, LEOUT and LEPREV, respectively, is derived from the gate AND1 such that these latches only load a new value for the when the data is valid and is being accepted (the Q outputs are HIGH from the output validation and acceptance latches LVOUT and LAOUT, respectively). In this way, they only hold valid extension bits and are not loaded with spurious values associated with data that is not valid.

In the embodiment shown in FIG. 7, the two-wire valid/accept logic includes the OR1 and OR2 gates with input signals consisting of the downstream acceptance signals and the inverting output of the validation latches LVIN and LVOUT, respectively. This illustrates how the gates NAND1/2 and INV1/2 in FIG. 4 can be replaced if the latches have inverting outputs.

Although this is an extremely simple example of a "state-dependent" pipeline stage, since it depends on the state of only a single bit, it is generally true as in this example that all latches holding state information will be updated only when data is actually transferred between pipeline stages, that is, only when the data is both valid and being accepted by the next stage. Care must be taken to ensure that such latches are properly reset.

The generation and use of tokens according to the invention thus provide several advantages over known encoding techniques for data transfer over a pipeline. First, the tokens according to the invention allow for variable length address field (and can utilize Huffman coding) to provide efficient representation of common tokens.

Second, consistent encoding of the length of a token allows the end of a token (and hence the start of the next) to be processed correctly (including simple non-manipulative transfer), even if the token is not recognized by the token decoder circuitry in a given pipeline stage.

Third, rules and hardware structures for the handling of unrecognized tokens (that is, for passing them on unmodified) allow communication between one stage and a downstream stage that is not its nearest neighbor in the pipeline. This also increases the expandability and efficient adaptability of the pipeline since it allows for future changes in the token set without requiring large-scale redesigning of existing pipeline stages. The tokens are particularly useful when used in conjunction with the two-wire interface that is described above and below.

Figure 8A:
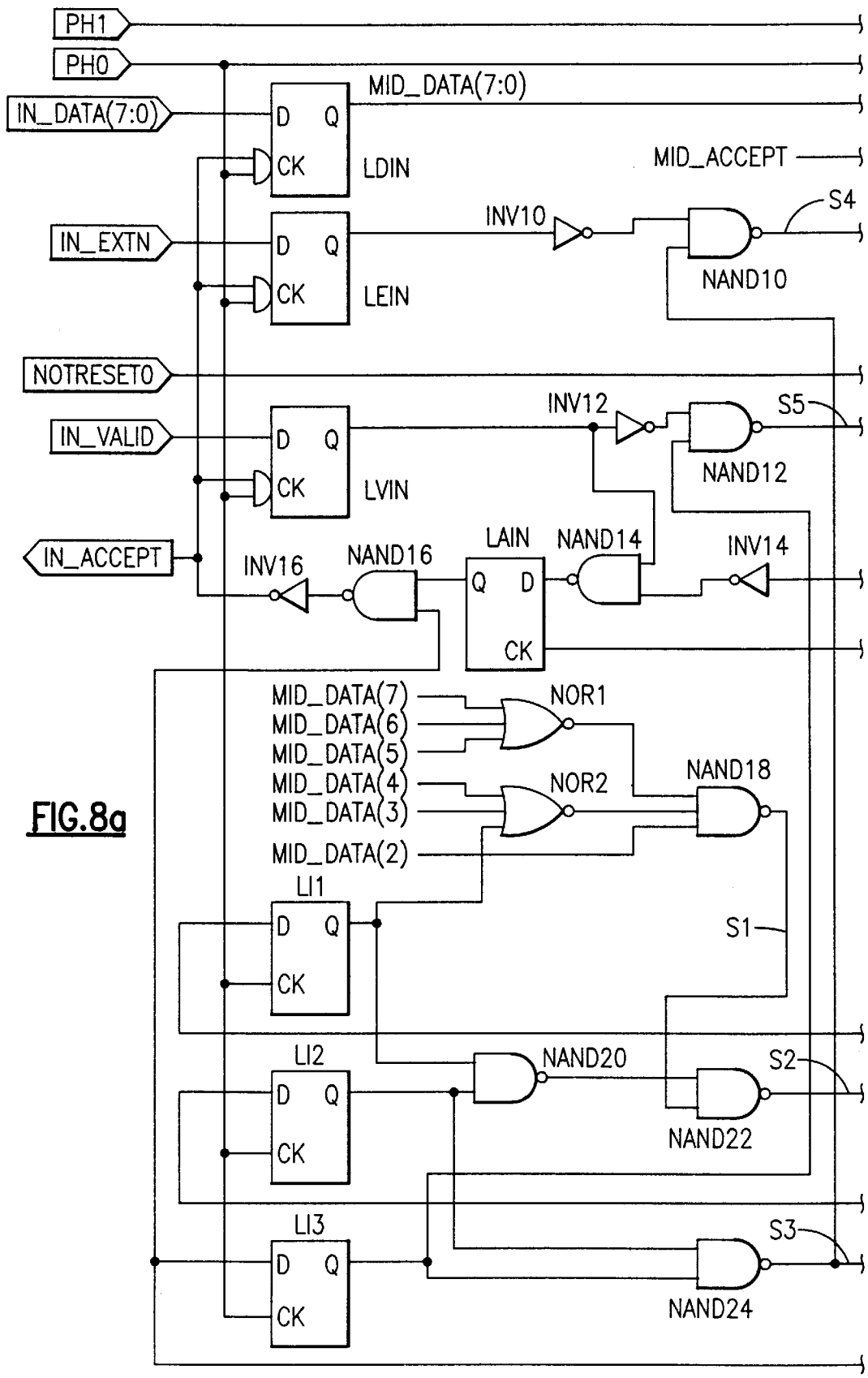
FIGS. 8a and 8b together form a block diagram showing the use of the two-wire transfer control according to the invention in an exemplifying "data duplication" pipeline stage.
Figure 8B:
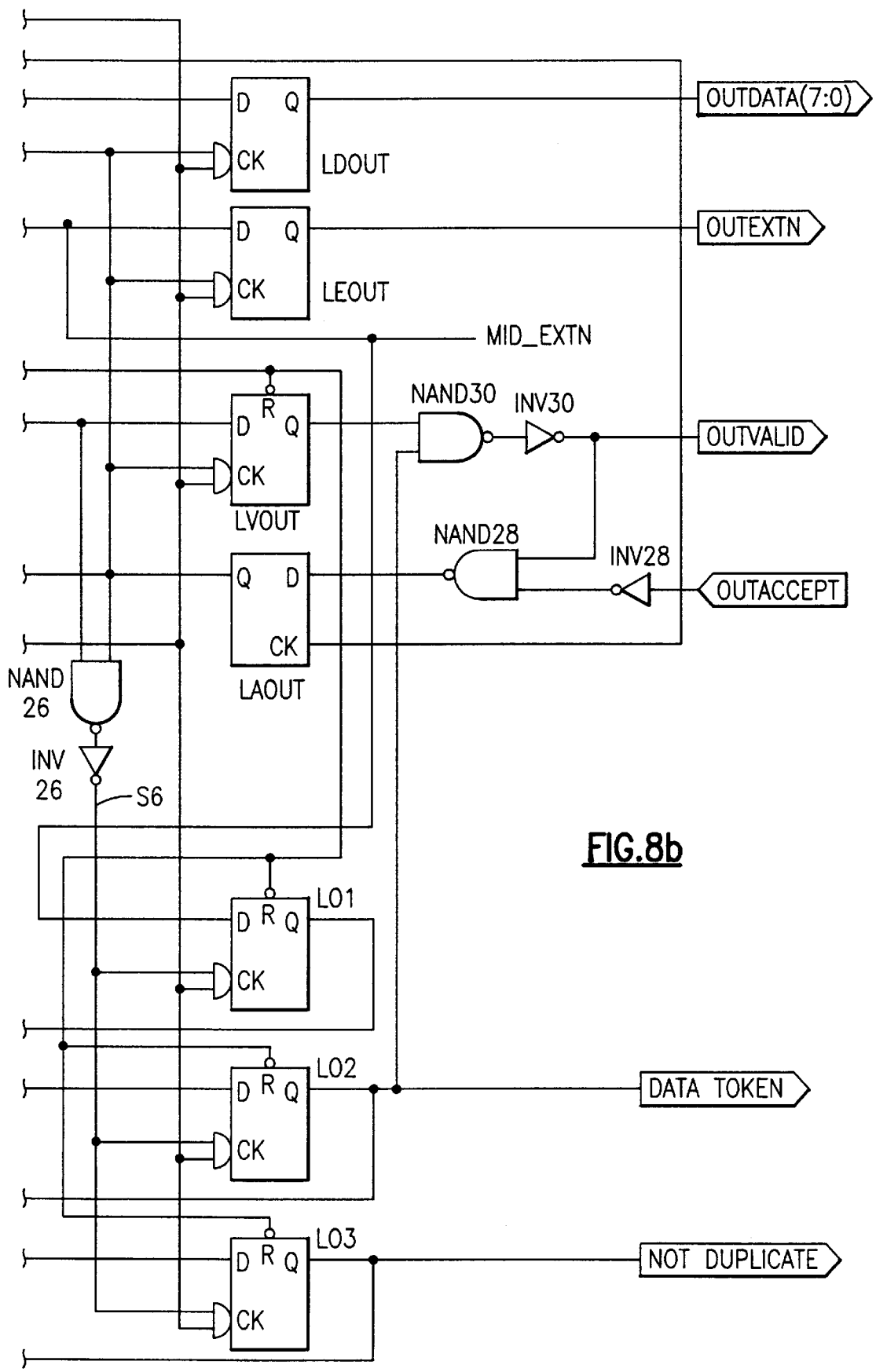

FIGS. 8a and 8b, taken together, form a block diagram of a pipeline stage whose function is to create a duplicate of data words when the stage is activated by a proper, predetermined token. These figures are referred to collectively below as FIG. 8. Many of the components of this illustrated system may be the same as those described the much simpler structure shown in FIG. 4; this illustrates a significant advantage of the invention: more complicated pipeline stages will still enjoy the same benefits of flexibility and elasticity, since the same two-wire interface may be used will no or only minor adaptation.

The data duplication stage shown in FIG. 8 is merely one example of the endless number of different types of operations that a pipeline stage could perform in any given application. This "duplication stage" illustrates, however, a stage that can form a "bottleneck", so that the pipeline according to the invention will "pack together". A "bottleneck" can be any stage that either takes a relatively long time to perform its operations, or that creates more data in the pipeline than it receives. This example also illustrates that the two-wire accept/valid interface according to the invention can be adapted very easily to different applications.

The duplication stage shown in FIG. 8 also has two latches LEIN and LEOUT that, as in the example shown in FIG. 6, latch the state of the extension bit at the input and at the output of the stage, respectively. As FIG. 8a shows, the input extension latch LEIN is clocked synchronously with the input data latch LDIN and the validation signal IN_VALID.

For ease of reference, the various latches included in the duplication stage are paired below with their respective output signals:

Latch Output Labels

| Latch | Output |
| --- | --- |
| LDIN | MIDDATA |
| LDOUT | OUTDATA |
| LEIN | QIN |
| LEOUT | OUTEXTN |
| LAIN | QAIN |
| LAOUT | QAOUT |
| LI1 | QI1 |
| LO1 | QO1 |
| LI2 | QI2 |
| LO2 | QO2 = DATA TOKEN |
| LI3 | QI3 |
| LO3 | QO3 = NOT DUPLICATE |

In the duplication stage, the output from the data latch LDIN forms intermediate data referred to as MID-DATA. This intermediate data word is loaded into the data output latch LDOUT only when an intermediate acceptance signal (labeled "MID-ACCEPT" in FIG. 8a) is set HIGH. Input data is therefore not automatically loaded into the data output latch, but rather the input and output data latches LDIN, LDOUT are loaded on alternate phases of the non-overlapping clock signals PH0, PH1.

The portion of the circuitry shown in FIG. 8 below the acceptance latches LAIN, LAOUT shows the circuits that are added to the basic pipeline structure to generate the various internal control signals used to duplicate data, as well as a "DATA TOKEN" signal that indicates to the following stage whether the present stage has received a valid data token and a NOT DUPLICATE signal that toggles between the HIGH and LOW states if the stage does not have a valid token, but is forced HIGH if the stage has not been activated by the proper data token. The NOT DUPLICATE signal thus indicates to the following stage whether the data being output on the OUTDATA bus is a duplicate of the immediately preceding output data word or not.

As FIG. 8a shows, the upper six bits of 8-bit intermediate data word and the output signal QI1 from the latch LI1 form inputs to a group of logic gates NOR1, NOR2, NAND18.

The output signal from the gate NAND18 is labeled S1. Using well-known Boolean algebra, it can be shown that the signal S1 is a "0" only in two circumstances:

(1) the output signal QI1 is a "1"; or (2) the mid-data word has the following structure: "000001xx", that is, the upper five bits are all "0", the bit MID-DATA[2] is a "1" and the bits in the MID-DATA[1] and MID-DATA[0] positions have any arbitrary value. Signal S1 therefore acts as a "token identification signal" which is low only when the MID-DATA signal has a predetermined structure or the output from the latch LI1 is a "1". The nature of the latch LI1 and its output QI1 is explained below.

Latch LO1 performs the function of latching the last value of the intermediate extension bit (labeled "MID-EXTN" and as signal S4), and it loads this value on the next rising edge of the clock phase PH0 into the latch LI1, whose output is the bit QI1 that is one of the inputs to the token decoding logic group that forms signal S1. Signal S1, as is explained above, drops to a "0" whenever the signal QI1 is a "1". Signal S1 therefore drops to a "0" whenever the last extension bit was valid (a "1").

Similarly, the signal DATA TOKEN that forms the output QO2 from the latch LO2 is loaded into the latch LI2 on the next rising edge of the clock PH0. The output QI2 from the latch LI2 therefore becomes a "1" only when the most recent data token was valid.

The outputs QI1 and QI2 are combined with the signal S1 in gates NAND20 and NAND22 to form the signal S2 which in turn forms the input to the latch LO2 that indicates the presence of a data token. Once again, using standard Boolean algebra, it can be shown that the signal S2 is a "1" only when the signal S1 is low, or both QI1 and QI2 are "HIGH". This means that the signal S2 is HIGH only if the stage received the correct "code" (the correct token in the upper 6 bits of the input word), or there was both a valid extension bit (QI1) HIGH and a valid DATA TOKEN (QI2 HIGH). The DATA TOKEN signal, therefore, only becomes HIGH in one of these two circumstances.

The NOT DUPLICATE signal (the output signal QO3) is similarly loaded into the latch LI3 on the next rising edge of the clock PH0. The output signal QI3 from the latch LI3 is combined with the output signal QI2 in a gate NAND24 to form the signal S3. As before, Boolean algebra can be used to show that the signal S3 is a "0" only when both of the signals QI2 and QI3 have the value "1". If the signal QI2 becomes a "0", that is, the DATA TOKEN signal is a "0", then the signal S3 becomes a "1". In other words, if there is not a valid DATA TOKEN (QI2=0) or the data word is not a duplicate (QI3=0), then the signal S3 goes high.

Assume now that the data token signal remains HIGH for more than one clock signal. Since the NOT DUPLICATE signal (QO3) is "fed back" to the latch LI3 and will be inverted by the gate NAND 24 (since its other input QI2 is held HIGH), the output signal QO3 will toggle between "0" and "1". If there is no valid data token, however, the signal QI2 will be a "0", and the signal S3 and, therefore, the output QO3, will be forced HIGH until the DATA TOKEN signal once again goes to a "1".

The output QO3 (the NOT DUPLICATE signal) is also fed back and is combined with the output QA1 from the acceptance latch LAIN in a series of logic gates (NAND16 and INV16, which together form an AND gate) that have as their output a "1" only when the signals QA1 and QO3 both have the value "1". As FIG. 8a shows, the output from the AND gate (the gate NAND16 followed by the gate INV16) also forms the acceptance signal IN_ACCEPT, which is used as above in the two-wire interface structure.

The acceptance signal IN_ACCEPT is also used as an enabling signal to the latches LDIN, LEIN, and LVIN. The result of this is that if the NOT DUPLICATE signal is low, then the acceptance signal IN_ACCEPT will also be low, and all three of these latches will be disabled and will hold the values stored at their outputs. The stage will not accept new data until the NOT DUPLICATE signal becomes HIGH, in addition to the requirements described above for forcing the output from the acceptance latch LAIN high.

As long as there is a valid DATA TOKEN (the DATA TOKEN signal QO2 is a "1"), the signal QO3 will toggle between the HIGH and LOW states, so that the input latches will be enabled and will be able to accept data at most during every other complete cycle of both clock phases PH0, PH1. The additional condition that the following stage be prepared to accept data, as indicated by a "HIGH" OUT_ACCEPT signal, must, of course, still be satisfied. The output latch LDOUT will, therefore, place the same data word onto the output bus OUTDATA for at least two full clock cycles. The extension bit output latch LEOUT will similarly duplicate the extension bit signal OUTEXTN. The OUTVALID signal, however, will be a "1" only when there is both a valid DATA TOKEN (QO2 HIGH) and the validation signal QVOUT is HIGH.

The output signal QEIN, which corresponds to the extension bit, is combined with the signal S3 in a series of logic gates (INV10 and NAND10) to form a signal S4. Applying the known functions of these logic gates, one can easily derive that the signal S4 is a "1" either when the extension bit was a "1" (QEIN was HIGH) or both of the signals QI2 and QI3 most recently had the value "1". The signal S4 is therefore HIGH when a valid extension bit was most recently clocked into the extension latch LEI1, or when there is a valid data token (QI2=1) that is not a duplicate (QI3=1). This signal S4 is loaded into the extension bit output latch LEOUT on the next rising edge of the clock signal PH1 and when the MID _ACCEPT signal is high.

The output signal QVIN from the validation latch LVIN is combined with the signal QI3 in a similar gate combination (INV12 and NAND12) to form a signal S5. Using known Boolean techniques, it can be shown that the signal S5 is HIGH either when the validation signal QVIN is HIGH, or when the signal QI3 is low (indicating that the data is not a duplicate). The signal S5 is loaded into the validation output latch LVOUT at the same time that MID-DATA is loaded into LDOUT and the intermediate extension bit (signal S4) is loaded into LEOUT. Signal S5 is also combined with the signal QO2 (the data token signal) in the logic gates NAND30 and INV30 to form the output validation signal OUT VALID. As was mentioned earlier, OUT VALID is HIGH only when there is a valid token and the validation signal QVOUT is high.

The MID-ACCEPT signal is combined with the signal S5 in a series of logic gates (NAND26 and INV26) that performs the well-known AND function to form a signal S6 that is used as one of the two enabling signals to the latches LO1, L02 and L03. The signal S6 rises to a "1" when the MID_ACCEPT signal is HIGH and when either the validation signal QVIN is high, or when the token is a duplicate (QI3 is a "0"). If the signal MID_ACCEPT is HIGH, the latches LO1–LO3 will therefore be enabled when the clock signal PH1 is high whenever valid input data is loaded at the input of the stage, or when the latched data is a duplicate.

From the discussion above, one will see that the stage shown in FIGS. 8a and 8b will receive and transfer data between stages under the control of the validation and acceptance signals, as in previous embodiments, with the exception that the output signal from the acceptance latch LAIN at the input side is combined with the toggling duplication signal so that a data word will be output twice before a new word will be accepted.

The various logic gates such as NAND16 and INV16 may, of course, be replaced by equivalent logic circuitry (in this case, a single AND gate). Similarly, if the latches LEIN and LVIN, for example, have inverting outputs, the inverters INV10 and INV12 would not be necessary; rather, the corresponding input to the gates NAND10 and NAND12 could be tied directly to the inverting outputs of these latches. As long as the proper logical operation is performed, the stage will operate in the same manner. Data words and extension bits will still be duplicated.

One should note that the duplication function that the illustrated stage performs will not be performed unless the data word that is input has a "1" in the second position of the word and "0's" in the five HIGH-order bits. (Of course, the required pattern can be easily changed and set by selecting other logic gates and interconnections than the NOR1, NOR2, NAND18 gates shown.) As FIG. 8a shows, the "decoding" bits of the input data word are tapped from the output bus of the latch LVIN and the stage will act as a simple conduit if the proper decoding bits are not presented.

As before, both validation latches LVIN, LVOUT in the stage can be reset by a single conductor NOTRESET0, and a single resetting input R on the downstream latch LVOUT, with the reset signal being propagated backwards to cause the upstream validation latch to be forced low on the next clock cycle.

Figure 9A:
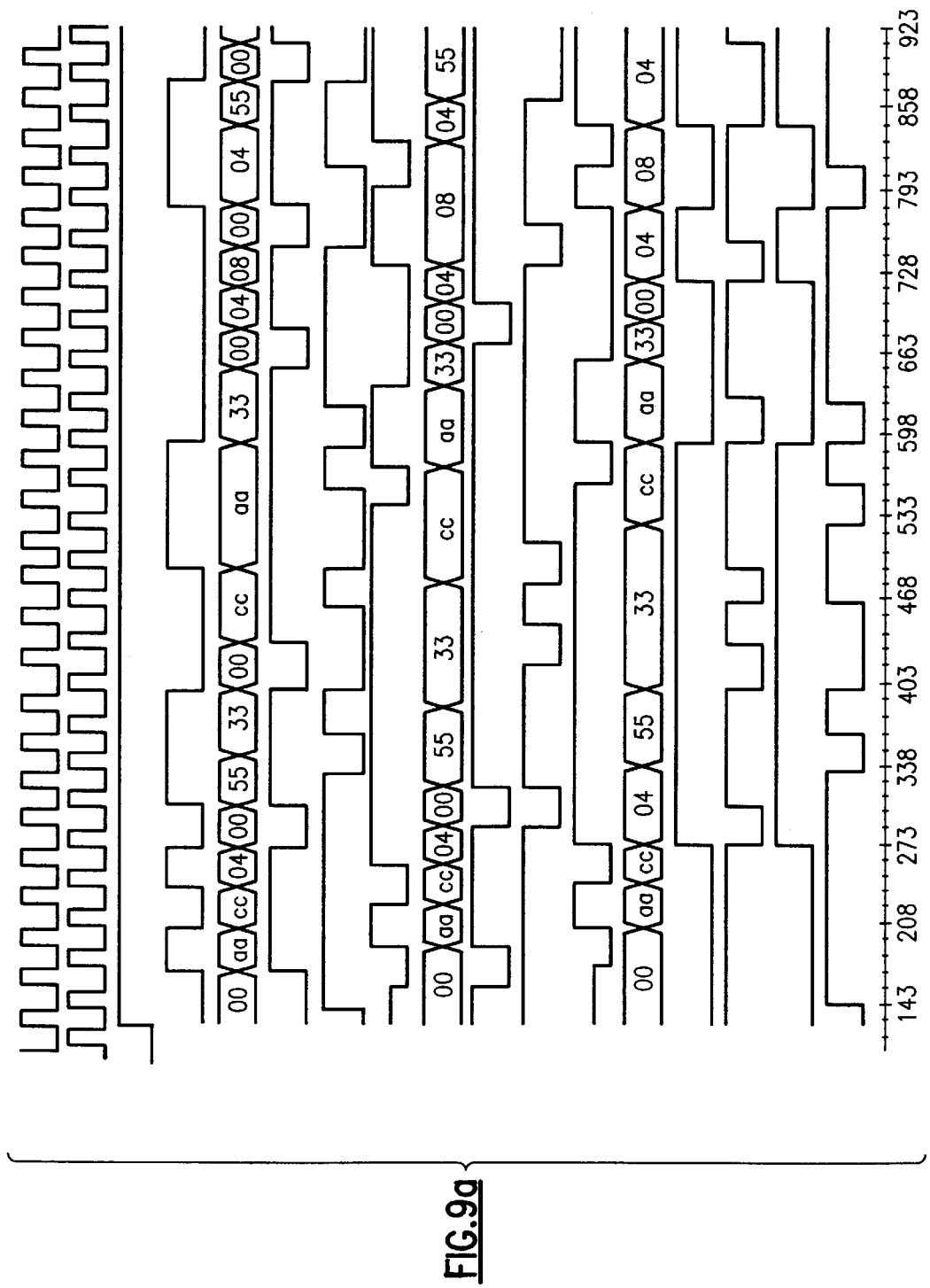
FIGS. 9a and 9b taken together are an example of a timing diagram that shows the two-phase clock, the two-wire transfer control signals and other internal data and control signals used in the exemplifying embodiment shown in FIGS. 8a and 8b.
Figure 9B:
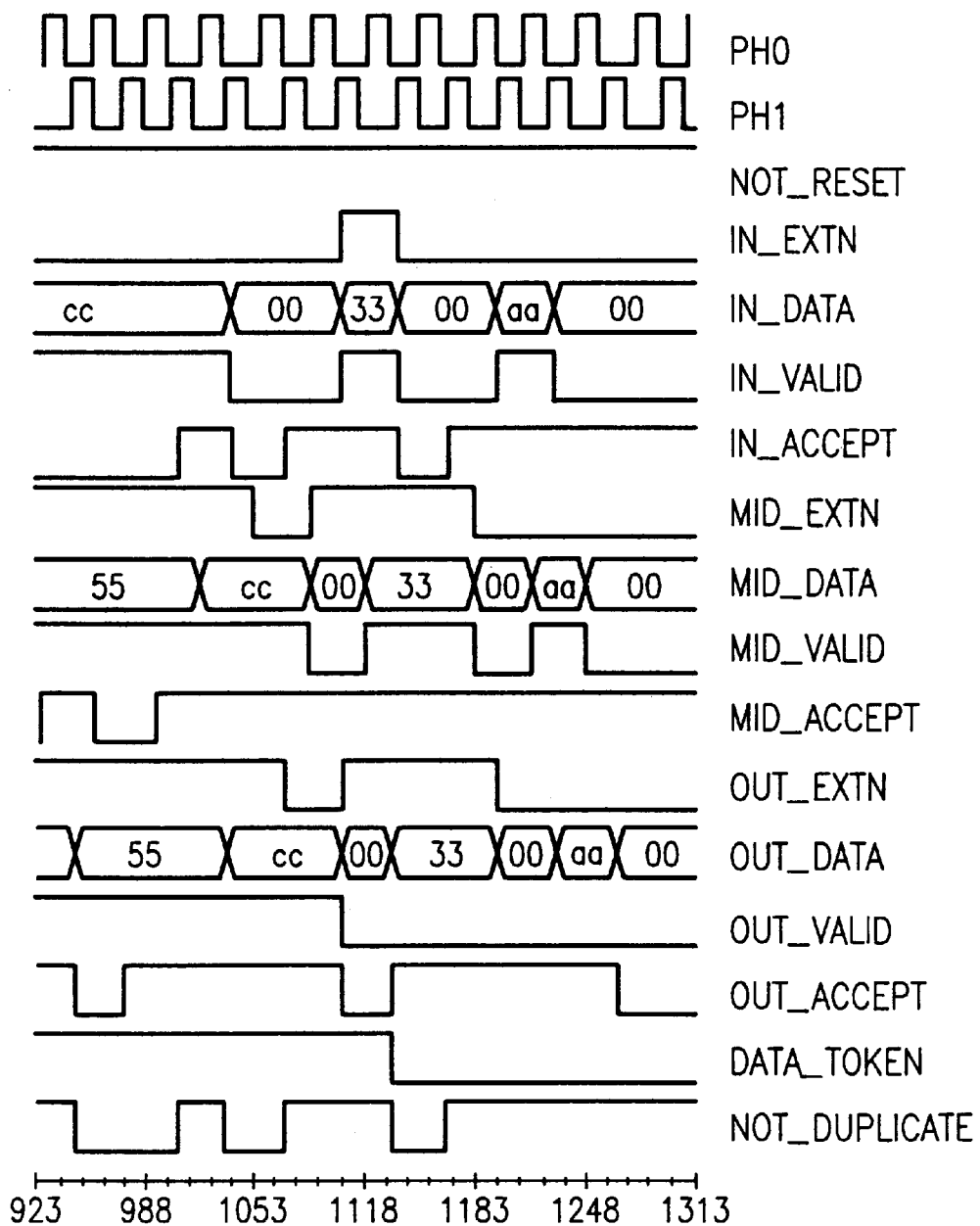

FIGS. 9a and 9b together show an example of a timing diagram for the data duplication circuit shown in FIGS. 8a and 8b. As before, the timing diagram shows the relationship between the two-phase clock signals, the various internal and external control signals, and the manner in which data is clocked between the input and output sides of the stage and is duplicated.

We claim:

1. In a data pipeline system for processing data, the system having a plurality of sequential pipeline stages, an input data storage device (LDIN) and an output data storage device (LDOUT) in each stage, with the output data storage device of each pipeline stage connected to the input data storage device of the next successive pipeline stage, the combination comprising:

electrical validation circuitry in each stage to generate a validation signal (IN_VALID, OUT_VALID) for a first state when data stored in said stage is valid and for a second state when data stored in said stage is invalid, said state defining said stage's ability to accept data, said validation circuitry including at least one validation storage device (LVOUT) to store said validation signal for the corresponding pipeline stage;

an acceptance signal connecting each adjacent pair of pipeline stages and conveying an acceptance signal (IN_ACCEPT, OUT_ACCEPT) indicative of the ability of said successive pipeline stage to load data stored in the preceding pipeline stage; and enabling circuitry connected to said data storage devices (LDOUT) for generating an enabling signal to enable loading of data and validation signals into the respective storage devices, wherein:

said data storage devices include a primary data storage device (LDOUT) and a secondary data storage device (LDIN);

said data is loaded into said respective primary data storage devices (LDOUT) and said validation signals are loaded into respective primary validation storage devices (LVOUT) at the same time;

data is loaded into each respective primary data storage device (LDOUT) when said acceptance signal assumes an enabling state; and said acceptance signal assumes said enabling state only when the acceptance signal associated with the data storage device of said next successive pipeline stage is in said enabling state or said data in said data storage device of said next successive pipeline stage is invalid.

2. A data pipeline system as recited in claim 1, wherein said acceptance signal (IN_ACCEPT, OUT_ACCEPT) constitutes said enabling signal for said data and validation storage devices.

3. A data pipeline system as recited in claim 1 or claim 2, wherein:

said input data storage device (LDIN) of each stage forms a secondary data storage device and a secondary validation storage device (LVIN) is included in each stage; and a primary acceptance storage device (LAOUT) is included in each stage to store the state of the acceptance signal (OUT_ACCEPT) of said next successive pipeline stage.

4. A data pipeline system as recited in claim 3, wherein:

said primary data and validation storage devices are formed as sections of a single primary storage unit and said secondary data and validation storage devices are formed as sections of a single secondary storage unit.

5. A pipeline system as recited in claim 3, wherein, a secondary acceptance storage device (LAIN) is included in each stage; and each stage is connected to a multi-phase, non-overlapping clock (PH0, PH1).

6. A pipeline system as set forth in claim 5, wherein:

said primary data storage device (LDOUT), said primary validation storage device (LVOUT) and said secondary acceptance storage device (LAIN) are enabled by a first clock phase signal (PH1) and said secondary data storage device (LDOUT), said secondary validation storage device (LVOUT) and said primary acceptance storage device (LAIN) are enabled by a second clock phase signal (PH0).

7. A data pipeline system as set forth in claim 1 or claim 2, wherein:

each of said pipeline stages includes predetermined processing circuitry having an active and an inactive mode; and an output from each secondary data storage device (LDIN) is connected as an input to said primary data storage device (LDOUT) of said corresponding stage via arbitrary logic circuitry.

8. A pipeline system as recited in claim 7, wherein:

predetermined ones of said pipeline stages include a data decoding circuit connected to said output of said secondary data storage device (LDIN), and said processing circuitry of each pipeline stage assumes said active state only when said secondary data storage device contains input data having a predetermined stage activation pattern.

9. A pipeline system as set forth in claim 8, wherein:

each pipeline stage includes a present extension bit input latch (LEIN) and an extension bit output latch (LEOUT) for loading an extension bit under the control of first clock phase signal (PH0), with said extension bit being transferred from a preceding device via an extension bit conductor (IN_EXTN; OUT_EXTN);

said output from said present extension bit input latch (LEIN) being connected to said input of said extension bit output latch (LEOUT);

the loading of said extension bit into said present extension bit input latch (LEIN) being enabled by said first clock signal (PH0) and the loading of said extension bit into said extension bit output latch being enabled by said second clock signal (PH1), said extension bit output latch loading said value of said extension bit previously loaded into said extension bit input latch;

each pipeline stage including a previous extension bit latch (LEPREV) for loading said output from said extension bit output latch (LEOUT) under the control of said first clock signal (PH0);

said extension bit being transferred from said preceding device via said extension bit conductor (IN_EXTN; OUT_EXTN) to said input of said present extension bit latch (LEIN); and said processing circuitry of each pipeline stage assuming said active state only when said previous extension bit, loaded in said previous extension bit latch (LEPREV), is in a predetermined one of two logical states.

10. In a data pipeline system for processing data, comprising:

a plurality of sequential pipeline stages;

an input data storage device (LDIN) and an output data storage device (LDOUT) in each stage, with the output data storage device of each stage connected to the following input data storage device of the next successive stage; and each stage including predetermined processing circuitry with an active state, which it enters when data entering said stage has a predetermined activation pattern, and an inactive state, in which said stage passes data to said following stage without processing;

at least one of said stages comprising a state machine having a current state and a previous state, and having means for maintaining said previous state;

wherein said stage is activated upon recognition of said predetermined activation pattern only upon a predetermined transition from said previous state to said current state, and each stage has an unblocked state, in which it is able to receive data without loss of previously stored valid data, and a blocked state, in which said stage contains valid data that cannot be transferred from said corresponding data storage device;

data being transferred into a current one of said pipeline stages even when at least one other pipeline stage following said current stage is in said blocked state; and each pipeline stage generating an acceptance signal to the immediately preceding pipeline stage with a first state when said stage does not contain valid data and when said stage contains valid data that can be transferred to a following data storage device, and generating a second state when said stage contains valid data that cannot be passed to said data storage device of the next successive stage;

said state machine of said one stage including a present extension bit input latch (LEIN) and an extension bit output latch (LEOUT) for loading an extension bit under the control of a first clock phase signal (PH0), with said extension bit being transferred from a preceding device via an extension bit conductor (IN_EXTN; OUT_EXTN);

said output from said present extension bit input latch (LEIN) being connected to said input of said extension bit output latch (LEOUT);

the loading of said extension bit into said present extension bit input latch (LEIN) being enabled by said first clock signal (PH0) and the loading of said extension bit into said extension bit output latch being enabled by a second clock signal (PH1), said extension bit output latch loading said value of said extension bit previously loaded into said extension bit input latch.

11. A pipeline system as set forth in claim 10, wherein each pipeline stage includes a previous extension bit latch (LEPREV) for loading said output from said extension bit output latch (LEOUT) under the control of said first clock signal (PH0), said extension bit being transferred from said preceding device via said extension bit conductor (IN_EXTN; OUT_EXTN) to said input of said present extension bit latch (LEIN); and said processing circuitry of each pipeline stage assumes said active state only when said previous extension bit, loaded in said previous extension bit latch (LEPREV), is in a predetermined one of two logical states.

12. A method of encoding digital data in a pipeline including a plurality of stages, each stage having an active mode, in which it transforms corresponding work data, and a passive mode, the method comprising the steps of:

a) applying a series of data words as a data stream to a first one of said pipeline stages in the form of digital signals;

b) generating and assigning to predetermined ones of said pipeline stages, respectively, predetermined, unique data activation words, so that each stage assumes its active state only upon receipt of said corresponding data activation word;

c) for a plurality of input data blocks, including in the data stream a sequence of address signals and, for each data word, an extension bit, a series of address bits, and data bits, said extension bit having a first and a second logical state;

d) setting said extension bit to said first logical state for a selected boundary word in each data block and to said second logical state for every other data word in said data block;

e) detecting a predetermined transition of said extension bit between said first logical state and said second logical state, and f) thereupon setting said address bits equal to corresponding bits of said activation pattern for said pipeline stage for which said data bits in said same data block are work data for said corresponding stage.

13. A system for providing a controlled passage of data, comprising:

a plurality of stages coupled to one another in a pipeline arrangement;

first means in each of said stages in said pipeline arrangement for storing data;

second means in each individual one of said stages in said pipeline arrangement for determining at each instant whether a successive stage in said pipeline arrangement is able at that instant to receive a transfer to said successive stage of the data stored in such individual stage at that instant;

third means in each individual one of said stages in said pipeline arrangement for determining at each instant whether such stage is able at that instant to pass data to said successive stage in said pipeline arrangement;

fourth means in each individual one of said stages in said pipeline arrangement for passing the data stored in such stage at each instant to said successive stage in said pipeline arrangement in accordance with the determination provided at that instant by said third means for such individual stage and for said second means for said successive stage in said pipeline arrangement;

fifth means for providing an individual address for each of said different stages in said pipeline arrangement, each of said addresses being formed by an individual sequence of binary bits with a different number of binary bits in said sequence than said number of binary bits in said sequence for other stages in said pipeline arrangement, said binary bits for each progressive number of binary bits in each sequence being different from said binary bits for such progressive number of binary bits in said sequences for the other stages in said pipeline arrangement;

means in each stage in said pipeline arrangement for responding to said individual address for such stage; and means for passing each of said addresses in said pipeline arrangement sequentially through said successive stages in said pipeline arrangement to said stage responsive in said pipeline arrangement to such individual address;

the operation of said fourth means for each stage in said pipeline arrangement at each instant being independent of the operation of said fourth means for said other stages in said pipeline arrangement at that instant to provide for the passage of data at each instant of data from individual ones of said stages in said pipeline arrangement at that instant to said stages adjacent to such individual stages in said pipeline arrangement without the passage at such instant of data from other stages in said pipeline arrangement to said stages adjacent to such other stages in said pipeline arrangement.

14. A system as set forth in claim 13, and further including:

means for resetting at least alternate stages in said pipeline arrangement to provide for subsequent passage of information to each stage from said previous stage in said pipeline arrangement.

15. A system as set forth in claim 13, and further including:

fifth means for providing clock signals;

said first means in each stage in said pipeline arrangement including first latching means;

said second means in each stage in said pipeline arrangement including second latching means;

third means in each stage in said pipeline arrangement including third latching means; and said first, second and third latching means being synchronized in their operation in accordance with said clock signals from said fifth means.

16. A system as set forth in claim 13, and further including:

fifth means for providing an individual address for each of said different stages in said pipeline arrangement, each of said addresses being formed by an individual sequence of binary bits with a different number of binary bits in said sequence than said number of binary bits in said sequence for other stages in said pipeline arrangement, said binary bits for each progressive number of binary bits in each sequence being different from said binary bits for such progressive number of binary bits in said sequences for the other stages in said pipeline arrangement;

means in each stage in said pipeline arrangement for responding to said individual address for such stage; and means for passing each of said addresses in said pipeline arrangement sequentially through said successive stages in said pipeline arrangement to said stage responsive in said pipeline arrangement to such individual address.

17. In a data pipeline system for processing data, the system having a plurality of sequential pipeline stages, an input data storage device (LDIN) and an output data storage device (LDOUT) in each stage, with the output data storage device of each pipeline stage connected to the input data storage device of the next successive pipeline stage, the combination comprising:

electrical validation circuitry in at least one stage to generate a validation signal (IN_VALID, OUT_VALID) for a first state when data stored in said stage is valid and for a second state when data stored in said stage is invalid, said state defining said stage's ability to accept data, said validation circuitry including at least one validation storage device (LVOUT) to store said validation signal for the corresponding pipeline stage;

an acceptance signal connecting an adjacent pair of pipeline stages and conveying an acceptance signal (IN_ACCEPT, OUT_ACCEPT) indicative of the ability of said successive pipeline stage to load data stored in the preceding pipeline stage; and enabling circuitry connected to said data storage devices (LDOUT) for generating an enabling signal to enable loading of data and validation signals into the respective storage devices, wherein:

said data storage devices include a primary data storage device (LDOUT) and a secondary data storage device (LDIN);

said data is loaded into said respective primary data storage devices (LDOUT) and said validation signal is loaded into a respective primary validation storage device (LVOUT) at the same time;

data is loaded into said respective primary data storage device (LDOUT) when said acceptance signal assumes an enabling state; and said acceptance signal assumes said enabling state only when the acceptance signal associated with the data storage device of said next successive pipeline stage is in said enabling state or said data in said data storage device of said next successive pipeline stage is invalid.

18. A data pipeline system as recited in claim 17, wherein:

said input data storage device (LDIN) of each stage forms a secondary data storage device and a secondary validation storage device (LVIN) is included in each stage; and a primary acceptance storage device (LAOUT) is included in each stage to store the state of the acceptance signal (OUT_ACCEPT) of said next successive pipeline stage.

* * * * *